United States Patent [19]

Smith

[11] Patent Number: 5,485,618
[45] Date of Patent: Jan. 16, 1996

[54] METHODS AND INTERFACE FOR BUILDING COMMAND EXPRESSIONS IN A COMPUTER SYSTEM

[75] Inventor: Kenneth W. Smith, Aptos, Calif.

[73] Assignee: Borland International, Inc., Scotts Valley, Calif.

[21] Appl. No.: 167,713

[22] Filed: Dec. 15, 1993

[51] Int. Cl.$^6$ ........................................................ G06F 9/45
[52] U.S. Cl. .................................. 395/700; 364/DIG. 1; 364/258; 364/259; 364/261; 395/100
[58] Field of Search ............................................ 395/700

[56] References Cited

U.S. PATENT DOCUMENTS

| | | | |
|---|---|---|---|
| 4,459,678 | 7/1984 | McCaskill et al. | 364/900 |
| 4,622,013 | 11/1986 | Cerchio | 434/118 |
| 4,648,062 | 3/1987 | Johnson et al. | 395/155 |
| 4,789,962 | 12/1988 | Berry et al. | 395/156 |
| 4,806,919 | 2/1989 | Nakayama et al. | 340/721 |
| 4,890,257 | 12/1989 | Anthias et al. | 364/900 |
| 4,899,276 | 2/1990 | Stadler | 345/113 |
| 4,964,077 | 10/1990 | Eisen et al. | 395/161 |
| 4,970,678 | 11/1990 | Sladowski et al. | 395/155 |
| 4,972,328 | 11/1990 | Wu et al. | 364/513 |
| 4,992,972 | 2/1991 | Brooks et al. | 395/155 |
| 5,029,113 | 7/1991 | Miyoshi et al. | 395/161 |
| 5,040,131 | 8/1991 | Torres | 364/521 |
| 5,123,087 | 6/1992 | Newell et al. | 395/155 |
| 5,155,806 | 10/1992 | Hoeber et al. | 395/157 |
| 5,157,768 | 10/1992 | Hoeber et al. | 395/157 |
| 5,179,654 | 1/1993 | Richards et al. | 395/157 |
| 5,255,363 | 10/1993 | Seyler | 395/164 |
| 5,303,146 | 4/1994 | Ammirato et al. | 364/401 |
| 5,317,686 | 5/1994 | Salas et al. | 395/157 |
| 5,317,688 | 5/1994 | Waton et al. | 395/161 |

OTHER PUBLICATIONS

Simpson, Alan, "Mastering WordPerfect 5.1 & 5.2 for Windows" SYBEX 1993, pp. 154–159.
Microsoft Visual C$^{++}$ Development System for Windows Ver. 1.0, The Programming Tools Manual p. 57 1993.
Dayton, Doug "Map Info adds geographic data analysis to Windows" PC Week Mar. 4, 1991 p. 35(2).
Gagnon, Gabrielle "Applications Manager " Ver. 4.0 PC Magazine Apr. 27, 1993 p. 151(4).
"Family Origins" Ver. 2.0 Parsons Technology, Inc 1991–Oct. 1992 pp. 28–29, 80, 81.
"TI Scheme Language Reference Manual" Texas Instruments Jul. 87.
Pappas, T. L. (Frank) "Unix-based editors keep syntax in check", PC Week Oct. 28, 1991 p. 107(3).
Kernighan, Brian, Dennis Ritchie "The C Programming Language" 2nd edition Prentice Hall pp. 24–27.
(No Author) "Lotus 1–2–3 User's Guide, Release 4", 1993, Lotus Development Corp. Cambridge, Mass. pp. 91–106.
Anderson, Richard B., "The Student Edition of Math CAD" Version 2.0, Addison–Wesley, 1989. pp. 34–41.
Microsoft Corporation, *Microsoft Excel User's Guide*, Ch. 10, pp. 125, 156–159, 1993.
Young, *X Window Systems: Programming and Applications with xt*, Prentice Hall, 1989, Hewlett–Packard, pp. 1–42.

(List continued on next page.)

*Primary Examiner*—Kevin A. Kriess
*Assistant Examiner*—St. John Courtenay, III
*Attorney, Agent, or Firm*—John A. Smart; Michael J. Ritter

[57] ABSTRACT

The system of the present invention comprises a development system having an Expression Builder for assisting a user with creating an expression. With full syntax checking enabled, the user builds an expression in "token" mode. As the user enters each token element, the system attempts to validate the expression and, if the expression is valid, displays the result. If the expression is incomplete or invalid, however, the system displays a message explaining what is needed. The Expression Builder of the present invention employs placeholders or "proxies" for representing elements in an expression which should be replaced before the expression is valid. The expression is dynamically adjusted during user editing as required to maintain expression validity. In this manner, the user is provided with in situ assistance in constructing syntactically-correct expressions.

30 Claims, 14 Drawing Sheets

U.S. PATENT DOCUMENTS

Scheifler et al., *X Window System: C Library and Protocol Reference,* Digital Press, Digital Equipment Corporation, 1988, pp. 3–117.

Tucker, *Programming Languages,* McGraw–Hill, 1986, pp. 230–254, 350–381.

Falkner, *Funk Utilities: Lots of Lotus 1–2–3 Tricks, If You've Got the Memory,* PC Magazine, Apr., 12, 1988, p. 38.

Funk Software, Inc., *The Worksheet Utilities,* Chapter 1, pp. 10–20 and Chapter 3, pp. 61, 1987.

Innovative Software, *Smart Ware: The Smart Spreadsheet with Business Graphics,* 1987, Ch. 2, pp. 2–1 to 2–12, Ch. 3, pp. 3–1 to 3–3, Ch. 4, pp. 4–1 to 4–16, Autohelp and Help pages.

Borland International, Inc., *Quattro Pro, version 2.0,* (1) *User's Guide,* pp. 12–16, 60–66 and 69–72, and (2) *@Functions and Macros* handbook, pp. 3–17, 1990.

METHODS AND INTERFACE FOR BUILDING COMMAND EXPRESSIONS IN A COMPUTER SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing systems and, more particularly, to assisting a user of such systems, such as a Database Management System (DBMS).

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake a specified activity.

Owing to their digital nature, computers essentially only understand "machine code," i.e. the low-level, minute instructions for performing specific tasks— the sequence of ones and zeros that are interpreted as specific instructions by the computer's microprocessor. Since machine language or machine code is the only language computers actually understand, all other programming or computer languages represent ways of structuring human language so that humans can get computers to perform specific tasks.

Computer languages are fundamental to modern-day computing. Although it is possible for humans to compose meaningful programs in machine code, practically all software development today employs one or more of the available computer languages. The most widely used of these are the "high-level" programming languages, such as C or Pascal. These languages allow data structures and algorithms to be expressed in a style of writing which is easily read and understood by fellow programmers.

Central to all high-level computer languages is the notion of evaluating expressions. An expression may be thought of in terms of its constituents: operands and operators. Operators are the members of the expression which define action—what type of operation is to occur upon execution of the expression. In the C programming language, for instance, a "+" operator specifies an addition operation. An "&&" operator, on the other hand, specifies a logical "And" operation. The former is an example of an arithmetical operator; the latter is a logical or Boolean one.

Operators typically require one or more operands— the data members which operators are to operate on. The addition operator (+), for instance, is a binary operator requiring two operands. Thus the expression 3+2 contains two operands—2 and 3—separated by the + operator. In this simple example, the expression evaluates to or "returns" a value of 5. Thus, The two numeric operands have been combined by an arithmetic operator to give (return) a numeric expression (i.e., an expression of a numeric data type).

An expression can be used as part of a larger expression, and so on without limit. This is usually thought of combining and evaluating operands (such as literal constants, named constants, and variables) with arithmetical, logical and other operators. To distinguish these levels, one uses the terms subexpression, subsubexpression, and so on. Thus the expression (3+2)*(1+(7+8)) contains two subexpressions: (3+2) and (1+(7+8)). The latter, in turn, contains a nested subexpression of (7+8). By convention, special parentheses operators—"("and")"—are used to group a sequence of operands and operators, as is known in both the computer and mathematical arts.

Each computer language provides rules or "syntax" for constructing valid expressions. These rules are usually recursive in the sense that valid subexpressions can be legally combined to give valid expressions. Expression validation therefore starts by evaluating the lowest level subexpressions, checking that these are correctly combined at the next level, and so on until the whole expression has been vetted. Consider the following (illegal) expression:

(3+2)*/(1+(7+8))

Here, the subsubexpression (7+8) and the subexpressions (1+(7+8)) and (3+2) would each pass the syntactical test, but the complete expression would fail because the resulting expression <numeric>*/<numeric> contains an illegal combination of the multiplication and division operators— */.

Also attendant to the construction and evaluation of expression is the notion of data types. In an effort to reduce programming errors, most computer languages require that constant and variable identifiers be assigned to a particular data-type attribute. Thus, a data type restricts the range of legal values that can be assumed by an identifier. Consider, for instance, the foregoing example of 3+2=5, restated in terms of variables (using the C++ programming language):

int a=3, b=2, c; c=a+b; // evaluates to 5, also int data type

Here, both operands are numeric data types (e.g., C's integer or "int" type); the result of the expression (5) is also a numeric data type. Typically, a strongly-typed language demands the explicit declaration of an identifier's data type before the identifier is used in an expression. For the example at hand, the variables are declared to be of type int (integer) before they are used. In this manner, an identifier's usage may be monitored throughout the program.

Many computer languages do not enforce data types at the programming level. Database manipulation languages (DMLs) often allow a user programmer to mix data types. In dBASE®, for instance, one may program:

a=3 && assigns numeric quantity to "a" a="three" && assigns text string to "a"

Weakly-typed languages deduce the identifier's data type from the context so that, for example, the assignment statement a="three" gives "a" the implied data type of String. Also shown in the above example, some languages allow changing of data type during program execution.

Undoubtedly the weakly-typed approach is flexible. Without data type information, however, ambiguities arise. Consider, for instance, the following:

a=3 && assigns numeric quantity to "a" b="2" && assigns text to "b" a=a+b && what result???

How the different data types are to be combined is unclear. The final expression could resolve to a numeric or a string value, or simply be flagged as an error. Because data types play a major role in the validation of expressions, a particular problem a programmer must contend with is what is the data-typing philosophy of the computer language employed.

Another problem facing the programmer is the overwhelming plethora of "functions" and "reserved words" which must somehow be correctly managed. Each function is defined by a prototype mandating a particular set of arguments and a return type. Expectedly, a significant proportion of human programming effort is devoted to inputting the correct formulation of expressions. And to make matter worse, many programming systems do not report invalid expressions until later in the development cycle.

What is needed is immediate feedback regarding the legality, evaluation, and data-typing of an expression as it is being composed. Not only would considerable programming time and effort be saved, but overall quality of the resulting code would be improved. The present invention fulfills this and other needs.

SUMMARY OF THE INVENTION

The system of the present invention comprises a development system having an Expression Builder. The system includes a preferred Command Interface for entering user commands for directing operation of the system. Commands comprise expressions—that is, meaningful collections of language elements used to perform an operation. Expressions in turn comprise memory variables, constants, functions, operators, array elements, field names, and the like.

The Expression Builder of the present invention includes a preferred interface comprising an Expression Window, a "Safety Net" checkbox, an Undo button, a Group button, an Expression Information (Result) box, Category, Type, and Paste list boxes, an Element Information box, a Result Type list box, and Dialog buttons. The Expression Window is where an expression is assembled. As each element is added by the user, it appears here, either in final form or in a form that prompts the user for further information. Below the Expression window are the Category, Type, and Paste list boxes. These lists are employed by the user, generally working from left to right, to select each element for the expression being built. As the user selects from each list, the list box to the right is updated to show choices available in that group. The Category list box displays the main categories of items (e.g., Constant, Field, Function, and the like) that the user can use in an expression. The Type list box shows the types available for each category shown. The Paste list box shows the actual elements for a given category and type chosen.

The "Safety Net" enables syntax checking features of the Builder. With the Safety Net enabled, the user builds an expression in "token" mode. Tokens are non-reducible textual elements, such as variable names, reserved words, operators, operands, parens, and the like. In this mode, the user is not permitted to edit the individual characters which comprise a token. Instead, the user is limited to selecting valid elements from the Paste list box. As the user enters each element, the system attempts to validate the expression and, if the expression is valid, displays the result in the Expression Information box. If the expression is incomplete or invalid, on the other hand, the system displays a message explaining what is needed.

The Expression Builder of the present invention employs color-coded placeholders or "proxies" for representing elements which must be replaced. For indicating to the user that an operator must be inserted, the system displays the letters "Op", for instance Caret (cursor) positioning within the expression is constrained so that each operator and operand is treated as an indivisible element or token. The user can position the caret only between each of these elements. Using these visual clues, an unskilled user can confidently select an appropriate token from the Paste list and copy it to a placeholder position. As the user builds an expression by deleting, editing, or pasting tokens, the Expression Builder dynamically adjusts its display of literal and placeholder tokens in the Expression Window to reflect the current status of the expression.

Driving the overall operation is a set of expression building rules. The rules describe how an expression is to be dynamically adjusted during user editing. In particular, the system treats an expression as a sequence of one or more tokens and cracks. A token includes any lexical unit, placeholder, operator, function call, argument, reserved word, or the like. Relationships between various tokens themselves are described in terms of insertion points or "cracks."

The rules dictate dynamical adjustment of the expression, based on the particular combination of tokens and cracks comprising an expression being edited. In an exemplary embodiment (one using the dBASE® programming language as the target language), rules may be defined as follows:

Rule 1: If an edit operation leaves two operands next to each other, a placeholder operator is placed between them.

Rule 2: If an edit operation leaves two operators next to each other, a placeholder operand is placed between them.

Rule 3: If an edit operation leaves a placeholder operand next to a placeholder operator, they are both deleted.

Rule 4: If an edit operation leaves an operator at the end of an expression, a placeholder operand is placed after it.

Rule 5: If an edit operation leaves a binary operator at the beginning of an expression, a placeholder operand is placed before it.

Rule 6: Pasting a real operator to the crack on either side of a placeholder operator replaces the placeholder with the real operator.

Rule 7: Pasting a real operand to the crack on either side of a placeholder operand replaces the placeholder with the real operand.

Rule 8: Deleting a grouping element "("or")" also deletes the matching element.

Rule 9: Deleting either a function name or its matching right paren, ")", also deletes the matching element.

Rule 10: Deleting a function name that has a comma-delimited argument list replaces each comma in that list with a placeholder operator.

Rule 11: If a function that requires arguments is pasted to a crack before an operand, the operand will be the first argument of the function.

Rule 12: Arguments of a function that are not replaced per rule 11 are represented initially by placeholder operands. The string value of the placeholder operand indicates the argument's usage and type.

In a preferred embodiment, these rules are codified in a table which characterizes a given crack, by specifying Before and After data types, as well as a String and a Type for the proxy to fill the crack (if one is required).

In this manner, the user is provided with on-the-fly assistance in constructing syntactically-correct expressions. A user can construct expressions and then paste those expressions to a current cursor or caret position in the Command Interface. The system effectively provides "in situ" editing of an expression.

DETAILED DESCRIPTION OF A PREFERRED EMBODIMENT

System Components

Figure 1A:
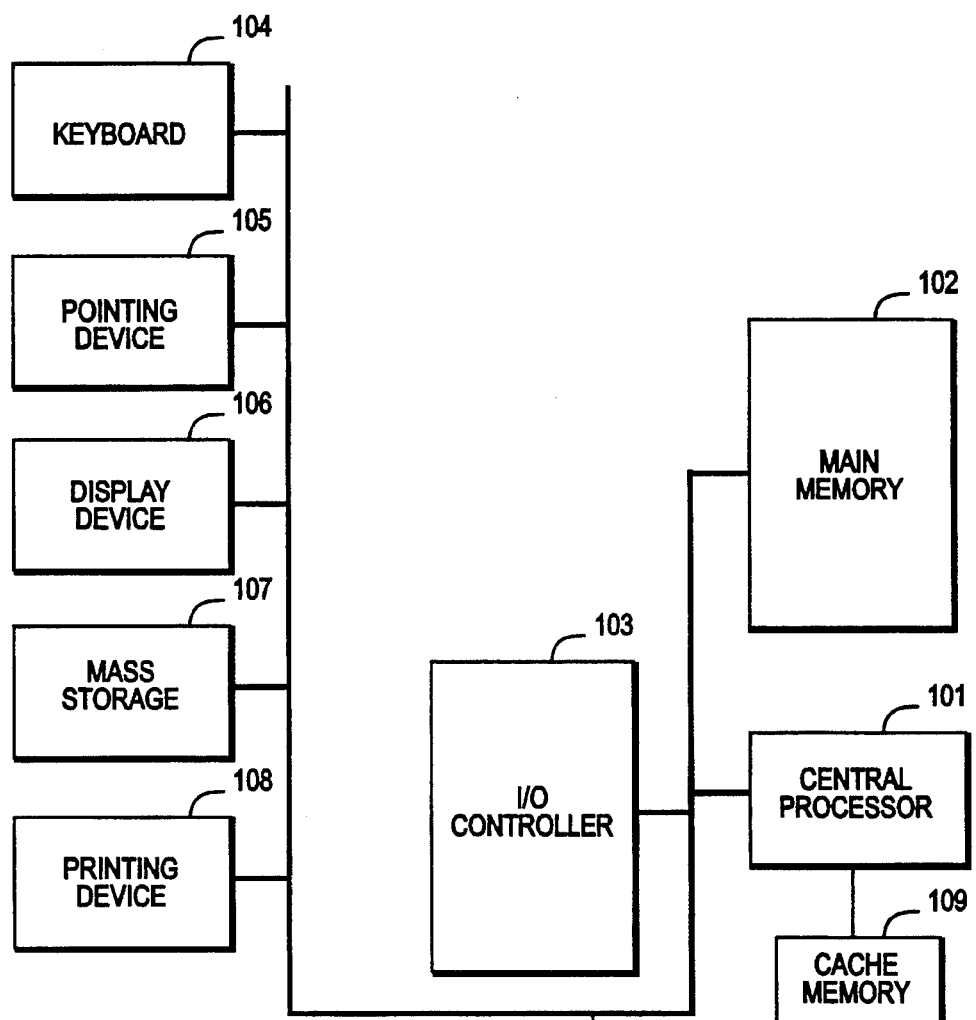
FIG. 1A is a block diagram of a computer system in which the present invention may be embodied.

The present invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Processor 101 includes or is coupled to a cache memory 109 for storing frequently accessed information; memory 109 may be an on-chip cache or external cache (as shown). Additional input/output devices, such as a printing device 108, may be included in the system 100 as desired. As shown, the various components of the system 100 communicate through a system bus 110 or similar architecture.

Figure 1B:
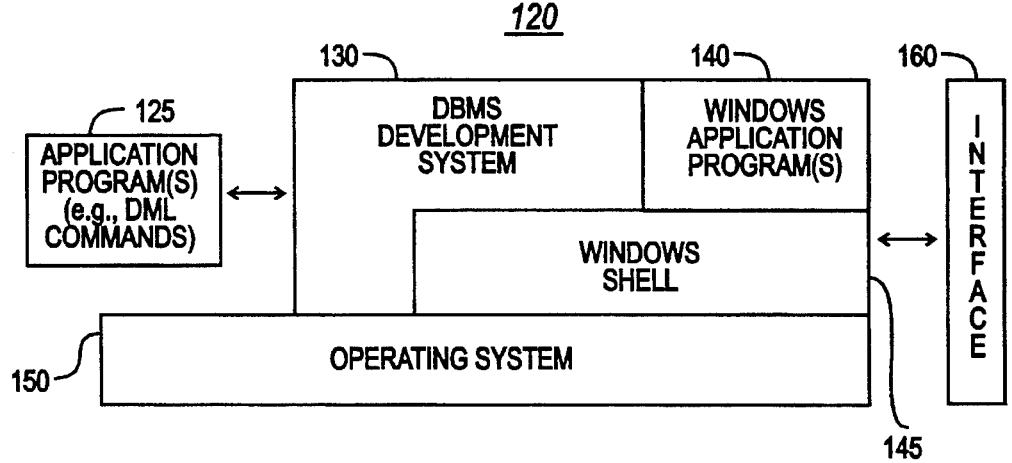
FIG. 1B is a block diagram of a software system of the present invention, which includes operating system, application software, and user interface components.

Illustrated in FIG. 1B, a computer software system 120 is provided for programming and operating the computer system 100. Software system 120, which is stored in system memory 102 and on disk memory 107, includes a kernel or operating system 150, a windows shell 145, and a Database Management System (DBMS) 130. OS 150 is the executive or supervisor for the system 100, directing both task management and data management. DBMS 130, on the other hand, includes a software subsystem for storing, retrieving, and manipulating information in database tables. Under the command of DBMS 130, the system 100 receives user commands and data through user interface 160. The interface 160 includes a command editor for processing system information, as described in further detail below. Additional application programs, such as DML command programs 125 (for further controlling the operation of DBMS 130) or windows application software 140, may be "loaded" (i.e., transferred from storage 107 into memory 102) for execution by the system 100.

In a preferred embodiment, the system 100 includes an IBM-compatible personal computer, available from a variety of vendors (including IBM of Armonk, N.Y.). Operating system 150 includes MS-DOS, and Windows shell 145 is Microsoft® Windows; both are available from Microsoft Corporation of Redmond, Wash. DBMS 130 preferably includes dBASE® DBMS (available from Borland International of Scotts Valley, Calif.). If desired, other operating systems and/or DBMSs (or alternative configurations thereof) may be employed in accordance with the principles of the present invention.

Interface

A. Introduction

The following description will focus on the presently preferred embodiments of the present invention, which are embodied in database applications operative in the Microsoft® Windows environment. The present invention, however, is not limited to any particular application or any particular environment. Instead, those skilled in the art will find that the system and methods of the present invention may be advantageously applied to a variety of system and application software, including electronic spreadsheet systems, wordprocessors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
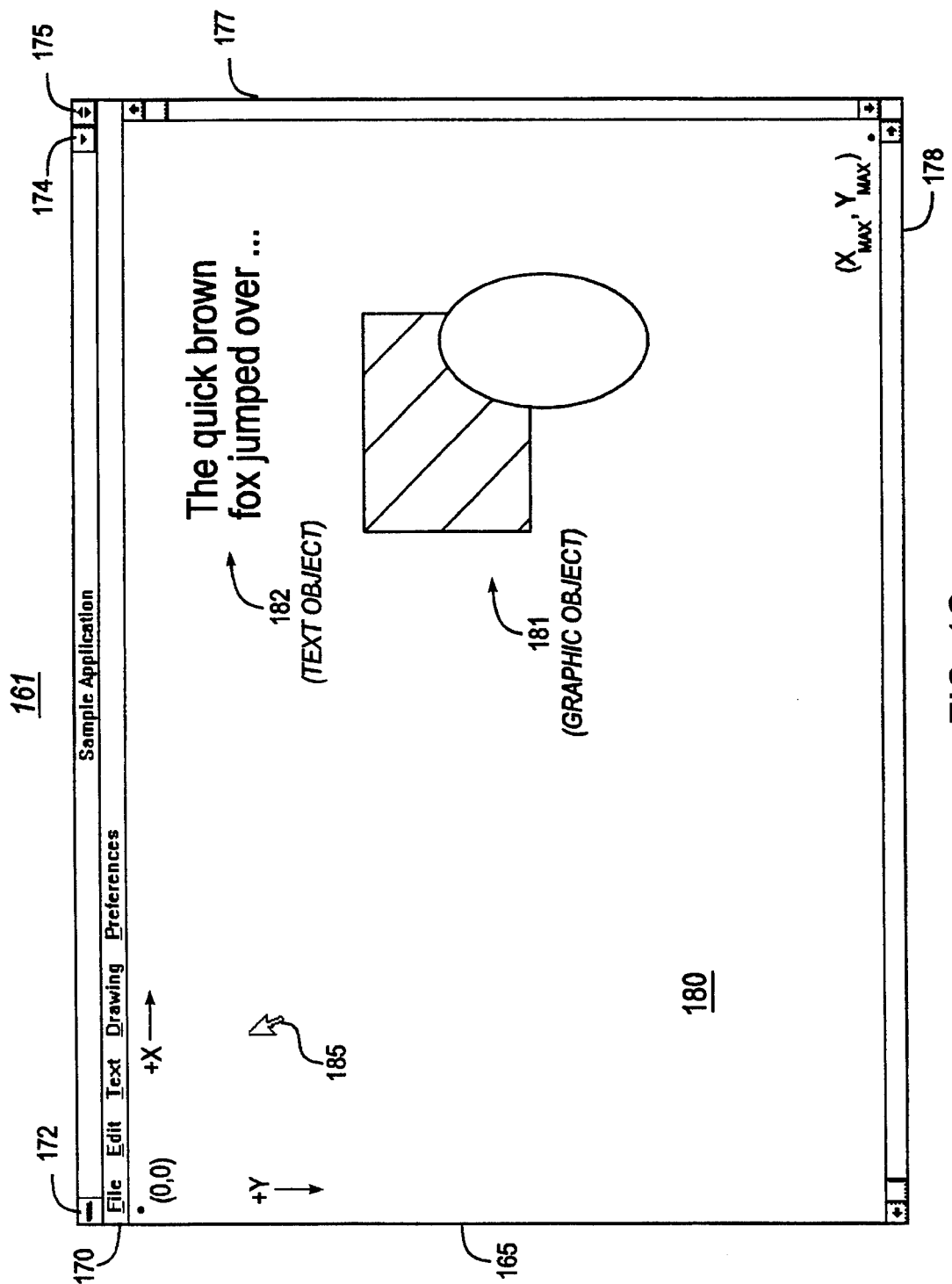
FIG. 1C is a bitmap screenshot illustrating the basic architecture and functionality of a graphical user interface which the system of FIG. 1B includes for communicating with a user.

In a preferred embodiment, the system 100 includes as the interface 160 a windowing interface or workspace 161, as shown in FIG. 1C. Window 161 is a rectangular, graphical user interface (GUI) for display on screen 106; additional windowing elements may be displayed in various sizes and formats (e.g., tiled or cascaded), as desired. At the top of window 161 is a menu bar 170 with a plurality of user-command choices, each of which may invoke additional submenus and software tools for use with application objects. Window 161 includes a client area 180 for displaying and manipulating screen objects, such as graphic object 181 and text object 182. In essence, the client area is a workspace or viewport for the user to interact with data objects which reside within the computer system 100.

Windowing interface 161 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 161 may be closed, resized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art; see, e.g., Petzold, C., *Programming Windows*, Second Edition, Microsoft Press, 1990. The disclosures of each are hereby incorporated by reference.

B. Preferred interface

1. Desktop

Figure 2A:
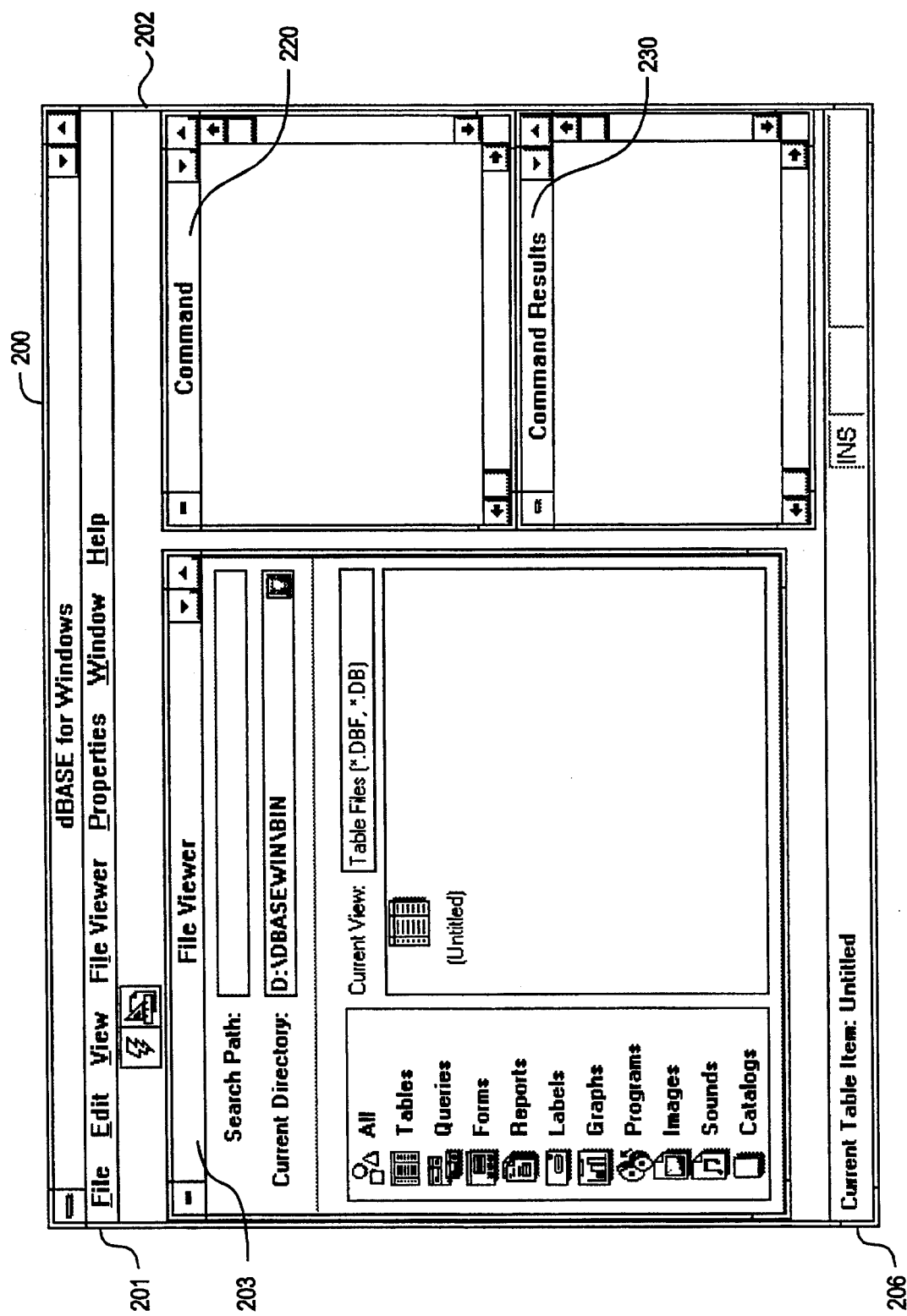
FIGS. 2A–C are bitmap screenshots illustrating a preferred interface for the relational database management system (RDBMS) system of the present invention.

Shown in FIG. 2A, a preferred interface for the database development system of the present invention will now be described. The interface comprises a Desktop 200 having a main menu 201, a toolbar 202, a File Viewer Window 203, a Command Window 220, a Command Results Window 230, and a status line 206. The menu bar 201 displays and invokes, in response to user inputs, a main level of user commands. Menu bar 201 also invokes additional pulldown menus, as is known in windowing applications. The Desktop 200, File viewer 203, Command Window 204, and Command Results Window 230 all have control-menu boxes, and minimize and maximize buttons, as is known in windowing applications. Status line 206 indicates the current status of the development system including, for example, the name of the table being processed.

The toolbar 202 comprises a row of tool icon buttons which provide a quick way for users to choose commonly-used menu commands or properties. The toolbar is a dynamic object in the sense that only the tools available in a given context are displayed. For instance, the editing tool icons will not appear unless the user is editing.

The File Viewer 203 includes edit boxes for entering file names and paths in order to display tables, forms, program source code, and the like. The user can enter a particular file name or, alternatively, select from a list of files that meet some user-supplied criterion. For example, by clicking on the "Tables" icon, the file viewer will display all table names (e.g., files with extension .DBF or DB) in the current directory. Clicking on a particular target table name will then open and display that table. Other selectable file types are All, Queries, Forms, Reports, Labels, Graphs, Programs, Images, Sounds, and Catalogs. These selections are also available via the View menu on the main menu bar 201.

2. Command interface

Commands for directing operation of the system are entered in the Command Window 220, which is a scrollable edit window that accepts user input for creating a sequence of commands. Commands can be any sequence of expressions, assignments, function calls, and the like, as mandated by a target language. In an exemplary embodiment, the target language is the dBASE® Language for manipulating database information. Those skilled in the art will appreciate that such an interface may be modified, in accordance with the teachings of the present invention, for other target languages.

Figure 2B:
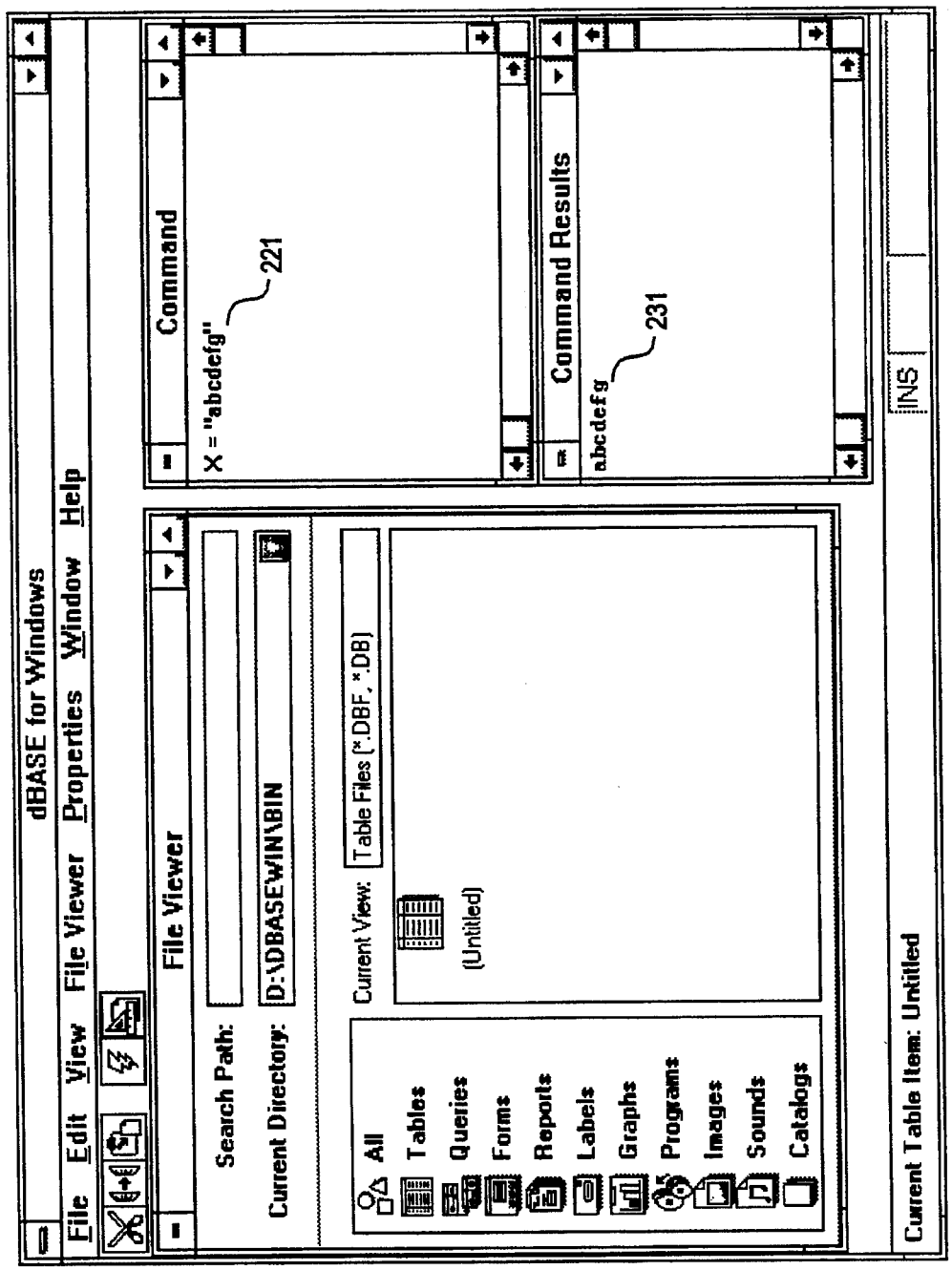

To aid the user in command entry, immediate feedback of the result (or "return value") of each command entered in the Command Window 220 is displayed concurrently in the Command Results Window 230. As illustrated in FIG. 2B, Command Results Window 230 is a scrollable, edit-style window which typically appears below the Command Window. For the example shown in the figure, the user has entered a string assignment:

X="abcdefg"

in the Command Window 220. The result of this expression, a string variable (now stored in X), immediately appears in the Command Results Window 230.

Command text 221 in the Command Window 220 can be edited by input device actions, together with further actions invoked from the Edit menu on the menu bar 201. Sections of text can be selected (highlighted) with a cursor-control device (e.g., mouse) for subsequent operations, such as cutting, copying, and pasting operations. An insertion cursor or "caret" (usually an I-beam shaped cursor) is also provided during editing of text for indicating a selection point for keyboard input, as is known in the art. The Command Window 220 can also be moved and resized, or maximized to the size of the Desktop, all without affecting the basic editing methods.

The Command Window 220 and Command Result Window 230 provide a basic worksurface for issuing interactive commands or constructing a program. Users often require additional assistance, particularly for constructing syntactically-correct expressions. Commands comprise expressions—that is, meaningful collections of language elements used to perform an operation. Elements of an expression may include, for instance, memory variables, constants, functions, operators, array elements, field names, and the like. Using the Expression Builder, a user can construct expressions, from simple to highly complex, and then paste those expressions to the current cursor or caret position. Thus, the Builder simplifies the overall process and ensures that expressions have the correct syntax (for a particular embodiment's target language).

Figure 2C:
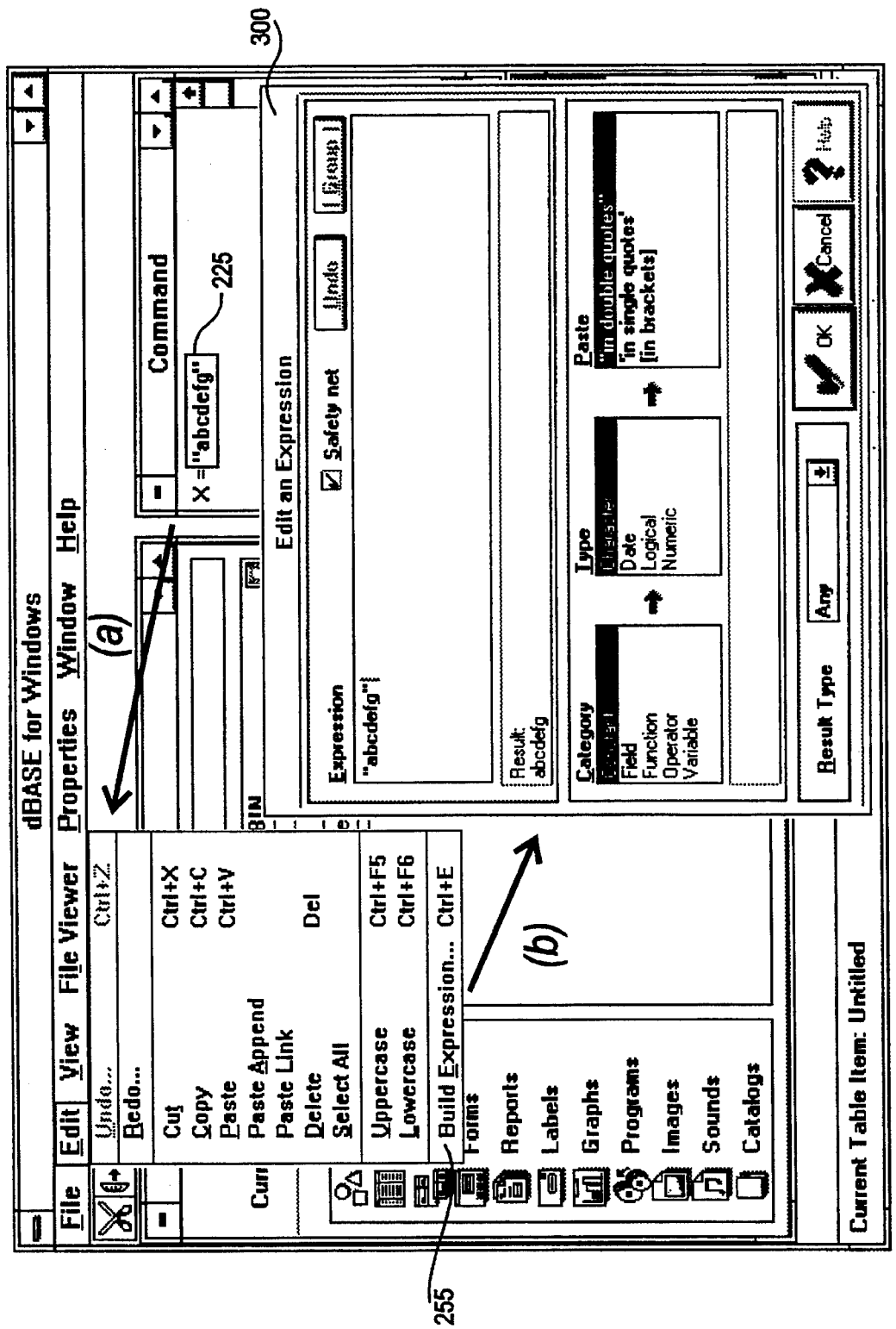

In a preferred embodiment, the Expression Builder may be invoked "in situ"—that is, while the user is editing an expression in the Command Window 220. As illustrated in FIG. 2C, for instance, the user invokes the Expression Builder by selecting (225) text and choosing a "Build Expression" menu choice 255 (from the Edit submenu). In response, the system displays an Expression Builder dialog 300. In this manner, any expression appearing anywhere in the Command Window 220 can be (optionally) transferred to an Expression Window of the Expression Builder. If a target expression is selected (highlighted), such as the expression "abcdefg" in FIG. 2C, that expression will appear in the Expression Builder dialog as the expression to be edited. The preferred embodiment also includes other ways for invoking the Expression Builder, such as by pressing an accelerator or "hot" key (e.g., Ctrl+E); by clicking on an Build Expression icon from toolbar 202; or by invoking a GETEXPR( ) function in the Command Window or in a program.

3. Expression Builder interface

Figure 3A:
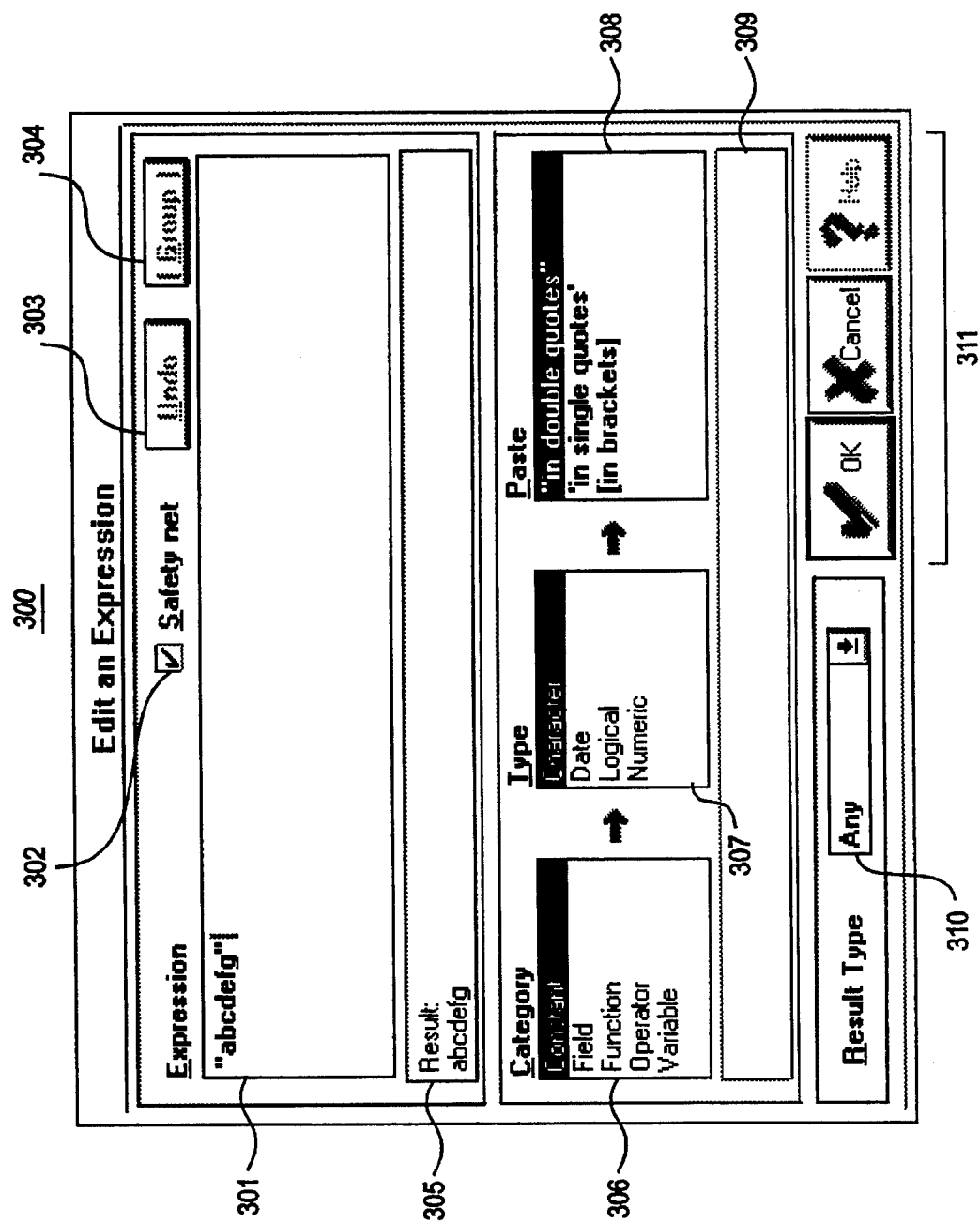
FIGS. 3A–C are bitmap screenshots illustrating a preferred interface for an Expression Builder module of the present invention.

Referring now to FIG. 3A, a preferred interface of the Expression Builder will be described. The Expression Builder dialog 300 includes an Expression Window 301, a "Safety Net" checkbox 302, an Undo button 303, a Group button 304, an Expression Information (Result) box 305, Category, Type, and Paste list boxes 306, 307, 308, an Element Information box 309, a Result Type list box 310, and Dialog ("OK", "Cancel", and "Help") buttons 311.

The Expression Window 301 is where an expression is assembled. As each element is added, it appears here, either in final form or in a form that prompts the user for further information. As an expression is being developed in the Expression Window 301, the current result of the expression is preferably always shown in the Result Box 305. In essence, this box mirrors the action of the Command Results Window 230 (described earlier). Thus as shown in FIG. 3A, the Result Box 305 displays "abcdefg"—the value of the expression "abcdefg" in the Expression Window 301.

Below the Expression Window and Result Box are the Category, Type, and Paste list boxes 306, 307, 308. These lists are employed by the user, generally working from left to right, to select each element for the expression being assembled. As the user selects from each list, the list box to the right is updated to show choices available in that group. The Category list box 306 displays the main categories of items—Constant, Field, Function, Operator, or Variable—the user can use in an expression. When the user chooses a category, the types available in that category appear in the Type/Table list box 307. In other words, the Type list box shows the choices for the category shown in the Category list. When "Field" (i.e., database field) is selected in the Category list, the Type list is labeled "Table" and shows available database tables. The Paste list box 308 shows the actual elements within the category and type chosen.

The user can set a desired data type of the expression being built by selecting from the Result type listbox 310. In a preferred embodiment, available data types include Any, Character, Date, Logical, and Numeric. The expression must evaluate to the specified result type before it is considered valid. If the selected result type does not match the data type of the current expression in the Expression Window 301, a warning message appears in the Result Box 305 and the "Ok" button for the dialog is dimmed. For instance, if a Numeric result type is selected while the current expression is "abcdefg", the warning "Wrong result type, desired result type is Numeric" is displayed in the Result Box. By selecting a result type of Any, the user may disable data-type checking feature as desired.

Figure 3B:
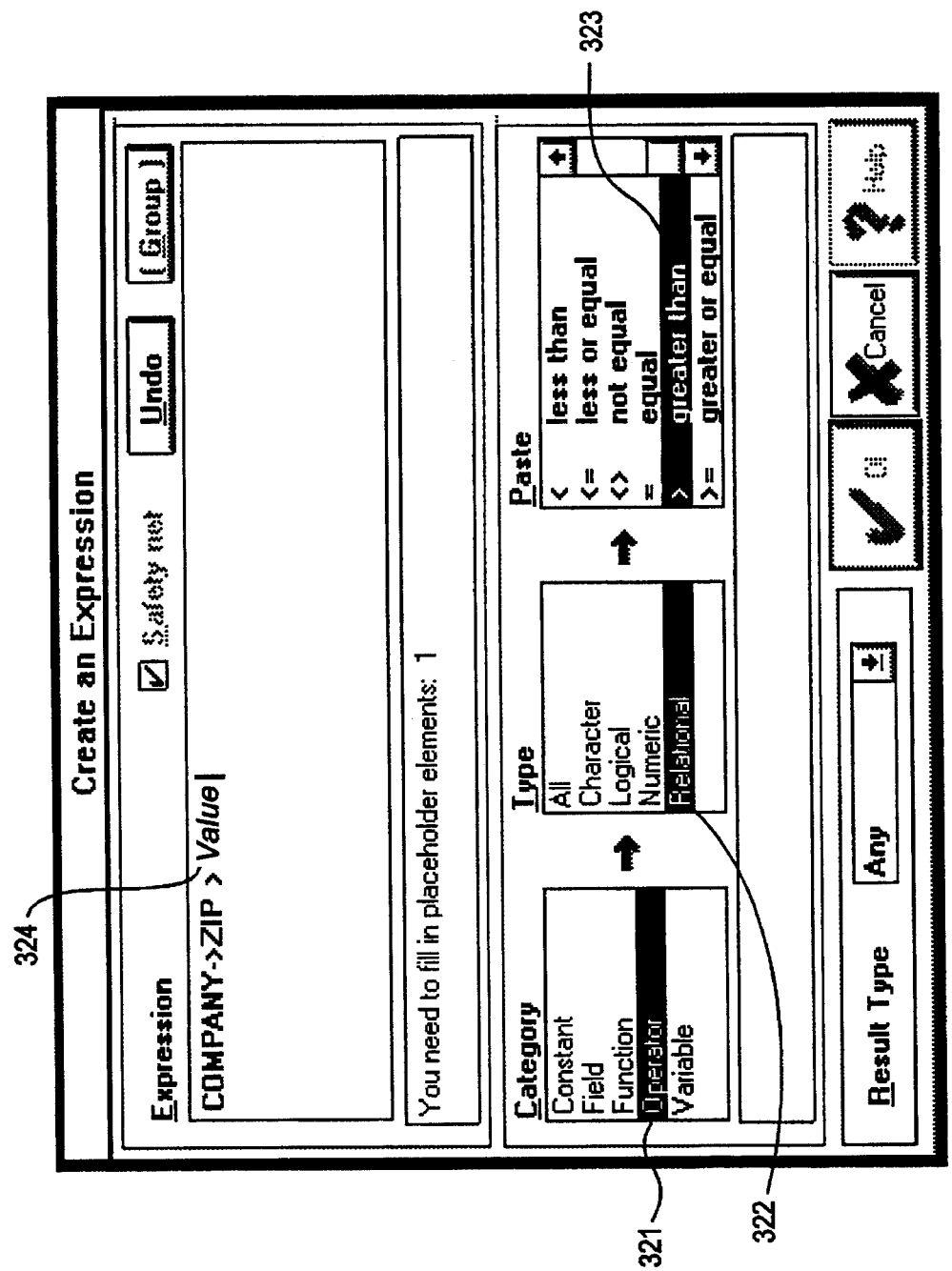

Before describing the Safety Net feature of the Expression Builder, simple use of the interface for creating an expression will be illustrated. As shown in FIG. 3B, the user typically starts building an expression by specifying a category: the user selects (clicks) one of the choices in the Category list 321, such as "Operator." The system, in response, updates the Type panel. As shown, for a category of "Operator" valid types include: All, Character, Logical, Numeric, and Relational. A user may select one of these, such as "Relational" 322 as shown.

Upon selection of a Type by the user, Paste list 323 now is updated (for indicating objects which may be pasted to the expression for this given Type). The user may now proceed to paste an element to the expression from the Paste list. For the example at hand, the user pastes the "greater than" (">") element into the Expression Window (e.g., by double-clicking, by drag-and-dropping, by pressing a spacebar, or the like). As shown, the ">" element is pasted into the expression. Moreover, a placeholder or "proxy" 324 (labeled "value") is positioned after the just-placed element, for indicating that a value is required to complete the expression. Now, the user may edit the proxy entry 324 for specifying a constant, a string, or other value. If a mistake is made while creating an expression, the user can click "Undo" button 303 to undo the last operation; the button is dimmed (inoperable) if no previous "undoable" editing action exists. To group items in parentheses, the user selects them in the Expression Window and clicks the Group button 304.

The user terminates the Expression Builder dialog by selecting OK and Cancel Dialog buttons 311, to accept or reject the dialog, respectively. The Expression Builder only permits valid expressions to be pasted back to the insertion point of the originating command or edit window. The user may choose to close the Expression Window and return the screen to its original state by pressing the Cancel button. Throughout the process the user may invoke a help menu by selecting the Help button.

4. Safety Met

The Expression Builder functions to guide the user in the building valid expressions which can then be pasted back to the appropriate command or program. General syntax-checking features of the Builder are enabled by the user invoking the Safety Net check box button 302. Clicking this button toggles the Safety Net off and on, subject to certain system-enforced restrictions (e.g., syntax errors in the current expression inhibit toggling of the Safety Net to off). In general, if the user wants maximum flexibility to type parts of an expression and paste others, he or she turns off the Safety Net. In this "expert" mode, expressions can be entered and edited as desired; syntax checking is postponed until requested by the user.

If, on the other hand, the user is not familiar with the target language (e.g., dBASE®) command syntax, he or she would typically turn on the Safety Net, for enabling continuous syntax checking by the system. With the Safety Net enabled, the user builds the expression in "token" mode. Tokens, such as variable names, reserved words, or operators, are non-reducible textual elements. Thus in this mode, the user is not permitted to edit the individual characters which comprise a token.

In a preferred embodiment, when the Safety Net is turned on, the user is limited to selecting valid elements from the Paste list box. As the user enters each element, the system attempts to validate the expression and, if the expression is valid, displays the result in the Expression Information box. If the expression is incomplete or invalid, on the other hand, the system displays a message explaining what is needed.

The system employs color-coded placeholders for representing elements which must be replaced. For indicating to the user that he or she must insert an operator, for example, the system displays the letters "Op" (e.g., displayed in bright white screen color). For indicating that an operand is required, on the other hand, the system displays descriptive text telling the user what kind of operand (e.g., character input or numeric input) must be inserted; in a preferred embodiment, the operand placeholder is displayed to the user with a yellow text color. Cursor (caret) positioning within the expression is constrained at this point, so that each operator and operand is treated as an indivisible element or token. The user can position the cursor only between each element (as opposed to positioning the cursor between characters, as is ordinarily done in text editing).

To turn off the Safety Net, the user "un-checks" the Safety Net box in the Expression Builder dialog. In a preferred embodiment, the user can only turn the Safety Net off if the expression in the window is valid. With the Safety Net off, the user can still select and paste elements, but the user is also given the additional flexibility of typing expressions or elements directly into the Expression Window. In this mode, expressions are validated only when the user clicks "Ok" or turns on the Safety Net. If the expression is not valid, the OK button is dimmed, and the user cannot insert the expression into the environment.

Figure 3C:
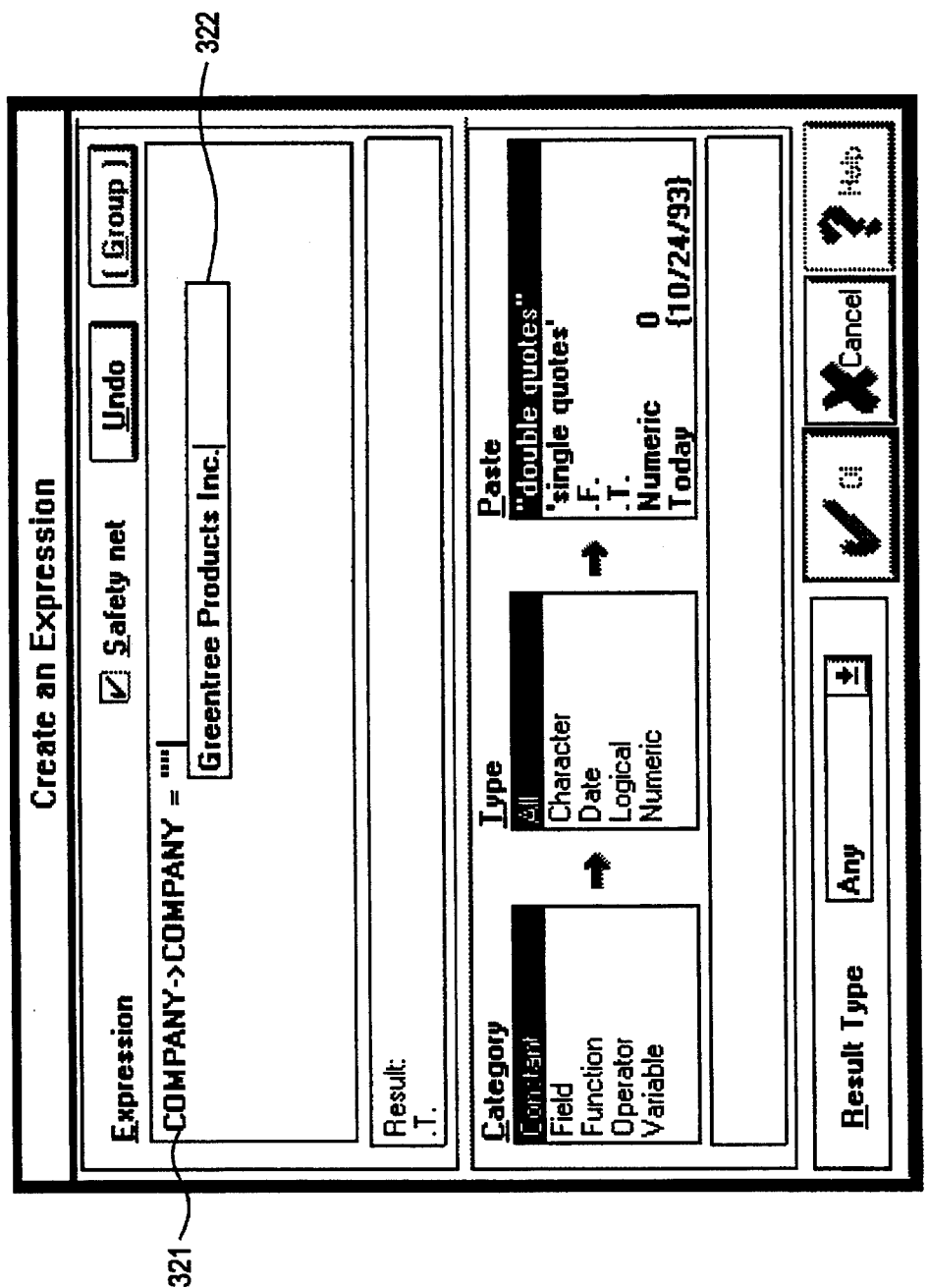

When the Safety Net is on, the user is prevented from typing directly into the Expression Window except when he or she is inserting a constant. This aspect of the Expression Builder is illustrated in FIG. 3C. Suppose, for example, that the user desires to enter a text string (or "string constant") after example expression 321. Here, the user enters a string constant into the expression by dragging or selecting it from the Paste list box; in response, the system places a double-quotes ("") placeholder. To edit this value, the user clicks at or near the placeholder and starts typing. In response, the system opens a text box 322 where the user can enter the new constant. The text box constrains inputs so that the user cannot insert illegal characters. The user cannot, for example, insert a letter where a numeric constant is specified. After user input has been completed, the user presses Enter, whereupon the constant is placed in the expression (replacing the placeholder).

5. Expression building session

Referring now to FIGS. 4A–E, an exemplary session of using the Expression Builder is illustrated. This example builds an expression that uses the substring or "SUBSTR" function. The function, which is common to many programming languages, extracts a substring (i.e., portion) from string data. As shown by the dialog 400a in FIG. 4A, the user begins by choosing Function category 411 from the Category list box. Next, the user selects String data 412 from the Type list box. In the Paste list box, two variants of the SUBSTR function are shown: "SUBSTR" AND "SUBSTR.". The latter limits substring length, the former does not. The user proceeds to paste the desired SUBSTR element 413 from the list to the expression. This can be done by double-clicking it, by pressing a spacebar key, or by drag-and-drop input methodology. The SUBSTR function 413 appears in the Expression Window.

As shown, the function 414 includes an identifier (label) 414a, followed by placeholders 414b, 414c, 414d for its expected parameters. The first placeholder 414b expects characters or text information. Thus, the expected operand having the appropriate data type (of the target language) is displayed, such as "expC¦memo field" for the dBASE® language. The second placeholder 414c, on the other hand, expects a numeric input for specifying the starting position value for the substring; "start expN" is displayed here for indicating that a numeric quantity is required for the start position. In a similar fashion, the third placeholder 414d expects numeric input for specifying the substring length; "length expN" is displayed accordingly. As additional user feedback, Element Information window 415 displays the proper syntax for the instant function.

Figure 4A:
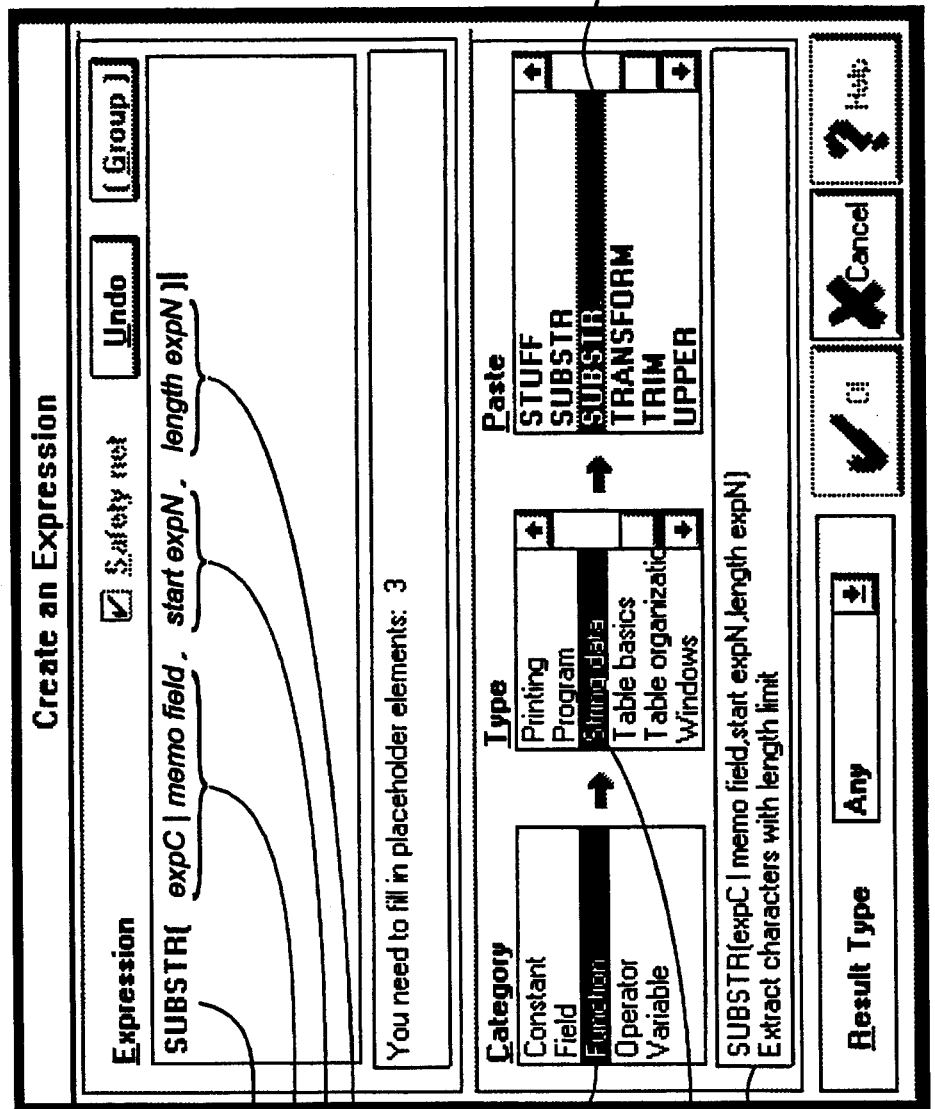
FIGS. 4A–E are bitmap screenshots illustrating operation of the Expression Builder interface, for assisting a user with the task of creating an expression.
Figure 4B:
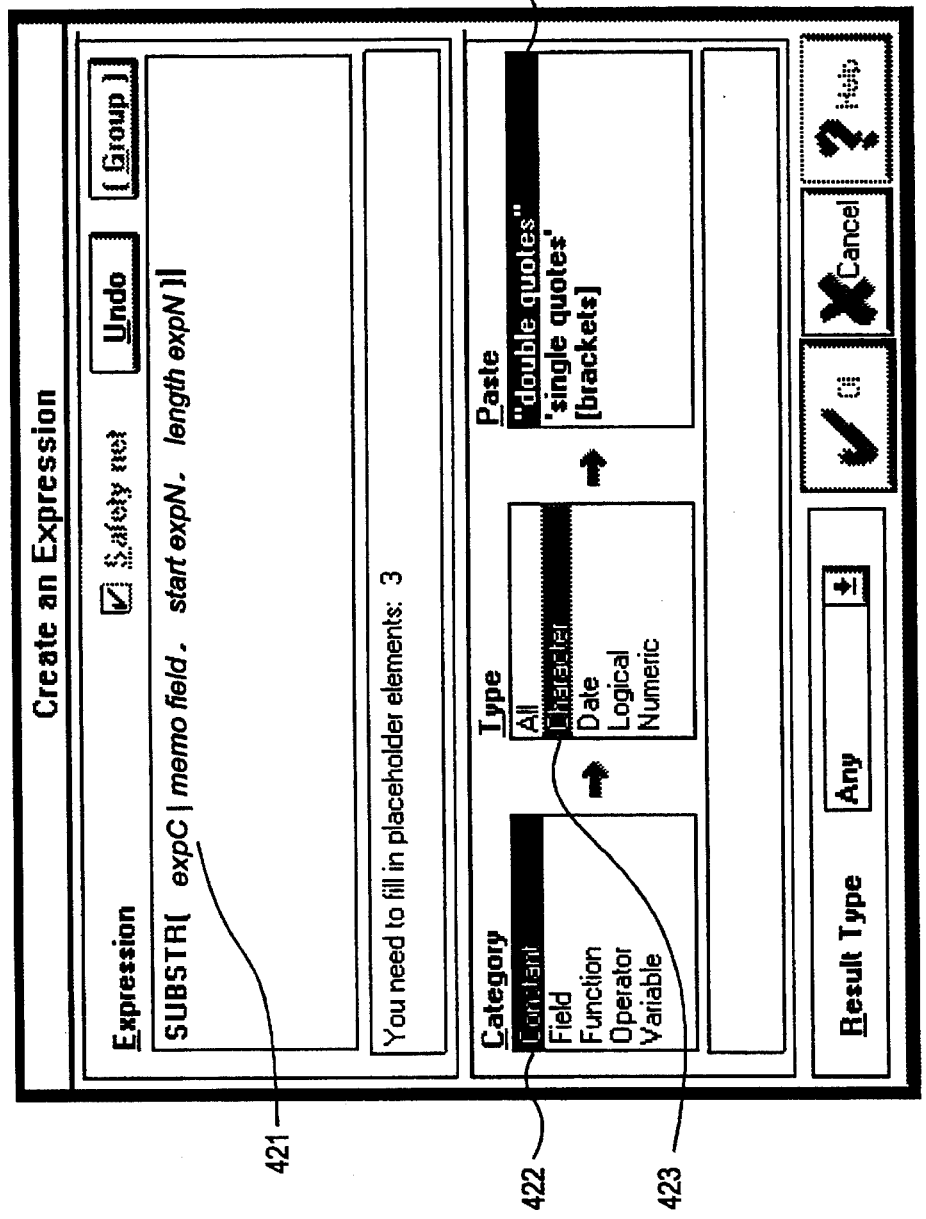

In FIG. 4B, the task of filling in the character string for the first placeholder is illustrated. The user clicks at or near the first variable (e.g., at position 421). Then, the user chooses Constant category 422 from the Category list and then selects Character type 423 from the Type list. Finally, the user pastes the "double quotes" element 424 to the expression.

Figure 4C:
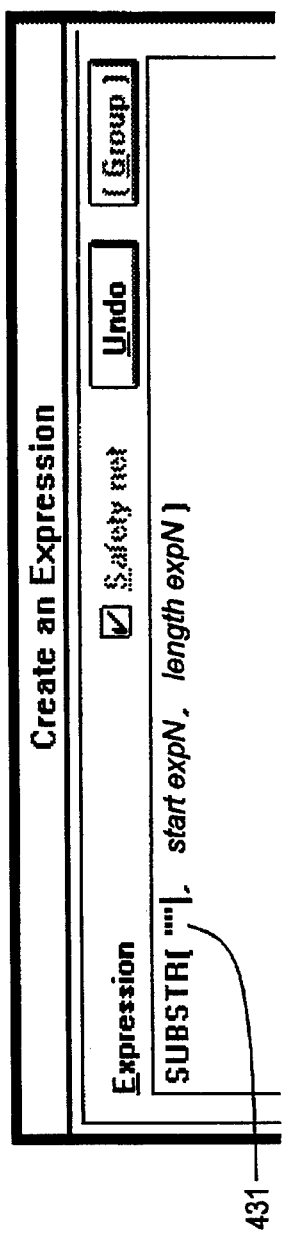
Figure 4C:
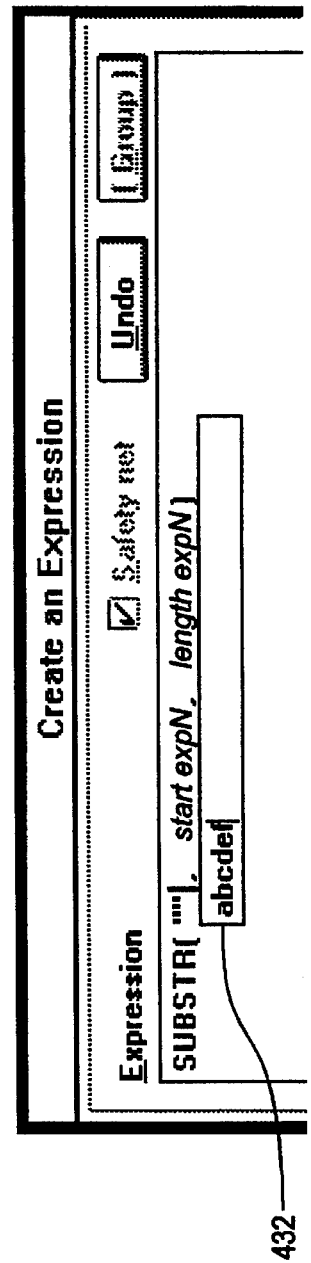
Figure 4D:
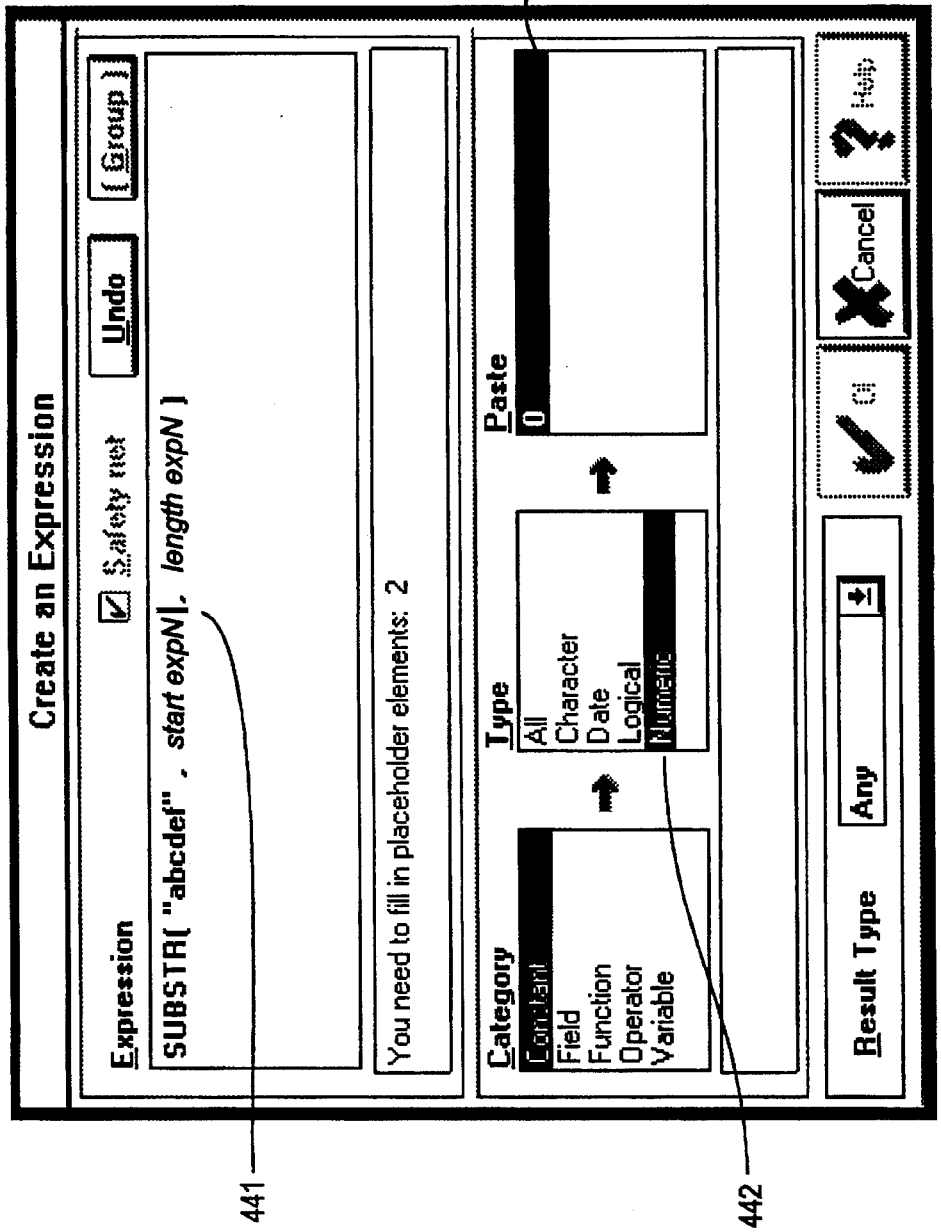

As shown by dialog 400c of FIG. 4C, double quotes ("") 431 appear in the expression at the position of the first parameter. The user may now click at or near the quotes and begin typing, whereupon the system displays an Edit box 432 for receiving the user input. After the user has typed characters into the box, he or she presses Enter, whereupon the input is placed in the expression, as shown in FIG. 4D.

Figure 4E:
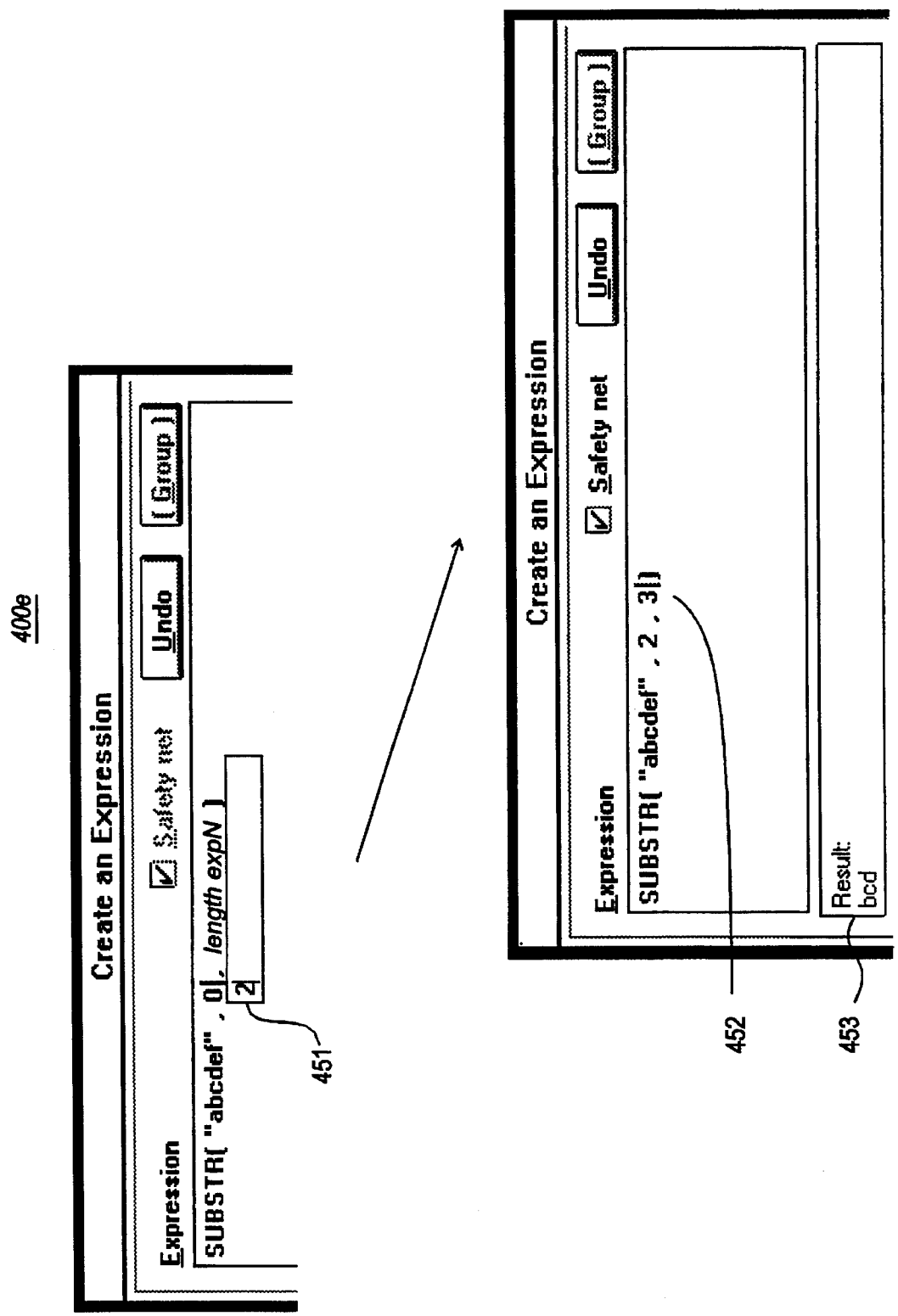

In a similar manner, the user may fill in the other parameters. For entering the second parameter for the function (i.e., the start value), the user clicks at or near the parameter, such as at position 441. Numeric type 442 is automatically selected from the Type list (as this is the only valid type for the parameter). The user pastes the "zero" element 443 to the Expression Window. As shown by FIG. 4E, by right clicking next to the "zero" numeric placeholder, the user invokes a text box 451; keyboard entry while the caret is near the token will also invoke the text box. Here, the user can enter a numeric value and press Enter. The process is repeated for filling in the third parameter 452. The completed expression is evaluated and the result is displayed in window 453. When the user has finished the expression, he or she can click "Ok" to paste it into the window or dialog box from which the user started the Expression Builder.

Internal operation

A. General design considerations

According to the present invention, expression building rules are enforced in the Safety Net. The following description will present exemplary expression building methods for supporting the Safety Net or token mode. Then, expression building rules applicable to the mode will be described together with expression building examples and exemplary C++ source code from a preferred embodiment.

As described above, the Safety Net button 302 (of FIG. 3A) toggles between on (checked) and off (unchecked) positions. With the Safety Net set to on, the Expression Builder works in token mode; when set to off, the Builder works in character (expert) mode. As additional user feedback, the background color of the Expression Window itself changes (e.g., from gray to white) when the Safety Net mode is toggled off and on.

In a preferred embodiment operating in token mode, the user typically pastes whole tokens from the Paste list 308 (of FIG. 3A) to the Expression Window. As illustrated by the preferred interface, constants can be entered by the user via an input device (e.g., keyboard 104 for specifying character input). Appropriate elements for the Paste list are automatically determined by the system, based on Category and Type elements selected from the Category and Type lists. Moreover, the Category and Type may be automatically selected by the system (e.g., by examining a particular parameter being editing by the user). In expert mode, the system allows the user to enter character (keyboard) input as well as to paste tokens.

For token pasting, the user selects a desired destination or insertion point, for instance, by positioning a caret (e.g., with a mouse or keyboard device). Unlike conventional cursor/caret positioning (e.g., in a text editor), the insertion caret of the Expression Builder may be constrained by the system to only allow token-by-token movement (rather than character-by-character movement); the insertion caret will always be positioned immediately before or after the nearest token. As described above, the tokens themselves are pasted by choosing (e.g., double-clicking) a token in the Paste list, by dragging-and-dropping a token from the Paste list to the Expression Window, or by selecting (highlighting) a token in the Paste list and then pressing the space bar. When using the drag-and-drop pasting method, the insertion caret becomes an intelligent cursor: the caret can only be positioned at legal dropping points in the expression (the nearest one being indicated to the user). If such an insertion destination meets the Expression Builder rules (described below), the pasted token will be copied into the evolving expression at the insertion point indicated by the Expression Window's insertion caret. As previously described, token-pasting or atomic editing action performed on the evolving expression can be immediately vitiated by clicking on the Undo button.

Any set of one or more contiguous tokens appearing in the Expression Window can be selected (highlighted) for possible grouping, that is, being surrounded by a matched pair of parentheses, "( )". If the Group button 304 (of FIG. 3A) is clicked, or the equivalent accelerator key (e.g., Alt+G) is pressed, a "(" character is inserted in front of the currently selected group of tokens, and a ")" character is inserted after the group. If no set of legally groupable tokens is selected, the Group button is dimmed (inoperable).

As demonstrated in the preferred user interface, the Expression Builder employs various token-like placeholders or "proxies," in addition to the literal tokens. These placeholders are displayed as color-coded textual elements indicating that a token of a stated type is missing at the given location. A white "Op" placeholder, for instance, indicates that the current expression lacks an operator at that position; a yellow text placeholder indicates that an operand of the specified data type is missing. The operand placeholder text can be "Value" indicating a generic operand, or in the case of function arguments, the placeholder may include descriptive text indicating a specific argument name and data type (e.g., the previously shown "length expN").

Using these visual clues, the unskilled user can confidently select an appropriate token from the Paste list and copy it to a placeholder position using any of the pasting methods described earlier. Placeholder elements can also be deleted just like normal tokens. If a set of tokens and/or placeholders is selected (highlighted) in the Expression Window prior to pasting a token from the Paste list, the pasted token replaces the selected items. Otherwise, the pasted item is inserted before, between, or after the existing tokens, depending on the position of the insertion caret.

The range of tokens available for pasting may be extended. For example, the user may select a Category of "Variable" and a Type "System" or "User" to extend the range of tokens available for pasting to all the built-in (system) and user-defined (local) named variables. Further, as these variables are selected, the Information box below the cascade windows displays a description of the variable. For example, selecting "Variable"¦"System"¦INDENT from the three cascade windows displays the legend:

> Specifies the number of columns the first line of each new paragraph is shifted left or right relative to the left margin.

As another example, selecting the Category "Field" changes the Type list to a Table list, allowing access to the structure of all tables in the currently designated directory. The field names, sizes, and data types of any table can be displayed in the Paste list, and any selected field name can be pasted into the evolving expression.

Where alternative operand types are allowed, the placeholder indicates these using the metasyntactic symbol ¦ (OR), such as the "expC¦Memo field" operand for the SUBSTR function shown in FIG. 4A. In a like manner, selecting Category "Function" and Type "String data", and then pasting the string function CENTER.. (where the two dots indicate that this version of CENTER is the second variant), the Expression Window shows:

> CENTER (expC¦Memo field, expN)

and the Results Window shows:

> "You need to fill in placeholder elements: 2"

The two missing tokens are (i) either expC, a character expression, or a specified Memo field and (ii) expN, a numeric expression. A description of the function CENTER appears below the cascade windows:

> "Pad string to center in <expN> w/char"

The user is free to switch between the Safety Net on and off modes provided that the current expression is legal. Otherwise, the Safety Net button is preferably dimmed (inoperable). A switch to Safety Net off may be useful to permit the manual insertion of, say, variable or function names not available from the Paste list, such as user-defined functions (UDFs). In an alternative embodiment, however, the Expression Builder may register user-defined variables and functions and make them available in the Paste list as well.

The Result Window indicates the result (return value) of a valid, complete expression, or displays a message indicating how many placeholder elements remain unresolved. In the event that the data type of the current expression differs from the data type selected, the Result Type window displays a warning. Until a valid, complete expression has been formed, the OK button 311 (of FIG. 3A) remains dimmed (inoperable). When a normal (undimmed, active) OK button is displayed, the user can transfer the valid, completed expression back to the originating Command or Editor window by clicking on the OK button.

As the user builds the expression by deleting, editing, or pasting tokens, the Expression Builder dynamically adjusts its display of literal and placeholder tokens in the Expression Window to reflect the current status of the expression. Exemplary rules for dynamically adjusting an expression during editing will be described next.

B. Expression-building Rules

1. Tokens and Cracks

To better understand the nature and operation of expression-building rules, it is helpful to review in detail the nature of a "token." A token may include any lexical unit, placeholder, operator, function call, argument, reserved word, or the like. A plurality of tokens may, in appropriate instances, be grouped together for acting as a single token.

Relationships between various tokens may be described in terms of insertion points or "cracks." Consider, for instance, the following a sequence of tokens:

$$T_0 T_2 \ldots T_n$$

Figure 5:
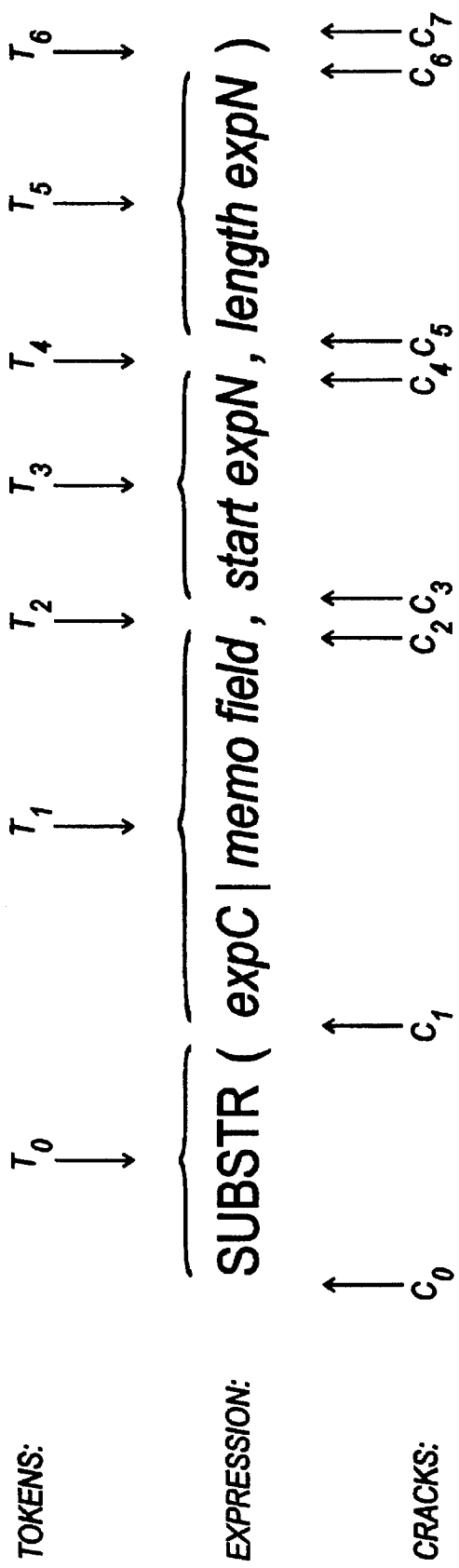
FIG. 5 is a diagram illustrating tokens and "cracks" for an exemplary expression.

For n number of tokens, there exists n+1 number of potential "cracks," that is, possible insertion points. Thus, the foregoing sequence of tokens may be rewritten as follows:

$$c_0 T_0 c_1 T_1 c_2 T_2 \ldots c_n T_n c_{(n+1)}$$

where $c_{(n)}$ represents a crack. The crack $c_0$ represents the starting (leftmost) insertion point; the crack $c_{n+1}$ represents the final (rightmost) insertion point. In operation, the Expression Window preserves the visual relation between tokens and cracks using standard word-wrap methodology. Tokens ($T_0$–$T_6$) and cracks ($C_0$–$C_7$) for the SUBSTR expression of FIG. 4A are illustrated in FIG. 5.

2. Rules

Exemplary rules for dynamically adjusting an expression during user editing will now be presented. In the rules that follow, a function or a group (a sequence of tokens surrounded by parentheses) can take the place of an operand. The process of applying a rule is itself an edit operation; hence, after a rule is applied, the rules must again be applied to see if any new rules apply.

Rule 1: If an edit operation leaves two operands next to each other, a placeholder operator is placed between them.

Rule 2: If an edit operation leaves two operators next to each other, a placeholder operand is placed between them.

Rule 3: If an edit operation leaves a placeholder operand next to a placeholder operator, they are both deleted.

Rule 4: If an edit operation leaves an operator at the end of an expression, a placeholder operand is placed after it.

Rule 5: If an edit operation leaves a binary operator at the beginning of an expression, a placeholder operand is placed before it.

Rule 6: Pasting a real operator to the crack on either side of a placeholder operator replaces the placeholder with the real operator.

Rule 7: Pasting a real operand to the crack on either side of a placeholder operand replaces the placeholder with the real operand.

Rule 8: Deleting a grouping element "("or")" also deletes the matching element.

Rule 9: Deleting either a function name or its matching right paren, ")", also deletes the matching element.

Rule 10: Deleting a function name that has a comma-delimited argument list replaces each comma in that list with a placeholder operator.

Rule 11: If a function that requires arguments is pasted to a crack before an operand, the operand will be the first argument of the function.

Rule 12: Arguments of a function that are not replaced per rule 11 are represented initially by placeholder operands. The string value of the placeholder operand indicates the argument's usage and type.

The following tables illustrates application of the rules for a given sequence of user actions.

| Action | Result | Rule applied |
|---|---|---|
| drag STATE to end | STATE | |
| drag = to end | STATE = operand | 4 |
| drag "CA" to end | STATE = "CA" | 7 |
| select 1–2 | STATE [=] "CA" | |
| drag <> to selection | STATE <> "CA" | 6 |
| | | |
| drag = to end | *operand* = *operand* | 4,5 |
| drag STATE to begin | STATE = *operand* | 7 |
| drag "CA" to end | STATE = "CA" | 7 |
| | | |
| drag "abcde" to end | "abcde" | |
| drag UPPER( ) to end | "abcde" *operator* UPPER( *string* ) | 1,12 |
| | | |
| drag "abcde" to end | "abcde" | |
| drag UPPER( ) to begin | UPPER( "abcde" ) | |
| | | |
| drag A to end | A | |
| drag D to end | A *operator* D | 1 |
| drag + to 1 | A + D | 6 |
| drag / to 2 | A + *operand* / D | 2 |
| drag + to 4 | A + *operand* / *operand* + D | 2 |
| select 0–5 | [A + *operand* / *operand*] + D | |
| group | ( A + *operand* / *operand* ) + D | |
| delete 6 | A + *operand* / *operand* + D | a |
| drag B to 2 | A + B / *operand* + D | 7 |
| drag C to 5 | A + B / C + D | 7 |
| select 4–7 | A + B / [C + D] | |
| group | A + B / ( C + D ) | |
| select 0–3 | [A + B] / ( C + D ) | |
| group | ( A + B ) / ( C + D ) | |
| | | |
| drag "abcde" to end | "abcde" | |
| drag SUBSTR( ) to 0 | SUBSTR( "abcde" , *start expN* , *length expN* ) | 11,12 |
| delete 0 | "abcde" | 9,10,3 |

(where "[" and "]" indicate selection, and italics represent placeholder tokens.)

3. Implementing the Rules

The following will focus on methods for implementing the foregoing rules using a general purpose programing language, such as C programming language (or its superset, C++). The C++ programming language is well documented in the trade, technical, and patent literature. See, for example, Ellis M. and Stroustrup B., *The Annotated C++ Reference Manual*, Addison-Wesley, 1990; the disclosure of which is hereby incorporated by reference. Suitable C++ compilers are available from several vendors, including Borland International of Scotts Valley, Calif., Microsoft Corp. of Redmond, Wash., and Symantec Corp. of Cupertino, Calif. Those skilled in the art, enabled by the teachings of the present invention, will appreciate that the methods of the present invention may be constructed in other development environments as well. Hence, the following is offered for purposes of illustration, not limitation.

The system of the present invention employs a Proxy-DefPart data structure for recording the placeholder pairs that can exist on either side of a crack, together with the possible tokens that can inserted between them. In C/C++, such a structure may be constructed by the following declaration:

```
struct ProxyDefPart
{
// before <crack> after
    unsigned Before;  // (e.g., EX_TYPE_OPERATOR for operator)
    unsigned After;
    const char* String;   // text for proxy token
    unsigned Type;        // type for proxy token
                          // (e.g., EX_TYPE_FIELD for field)
};
```

As shown, the structure includes Before and After data members specifying types for the placeholder pairs that can exist on either side of a crack. Recall that an element which borders a crack may include an operator, a field, a constant, a comma, a left paren, a right paren, a function, and the like. In a preferred embodiment, therefore, the Before and After data members are represented as enumerated data types, including, for instance, EX_TYPE_OPERATOR, EX_TYPE_FIELD, EX_TYPE_CONSTANT, EX_TYPE_COMMA, EX_TYPE_LEFTPAREN, EX_TYPE_RIGHTPAREN, EX_TYPE_FUNCTION, and the like. If Before is 0, the crack represents the beginning of the expression. If After is 0, the crack is at the end of the expression.

The third data member of the ProxyDefPart data structure is String, a pointer to a character array. The character array (ProxyOperandString or ProxyOperatorString) stores the descriptive string for the operand (as previously demonstrated in the user interface above). The fourth data member, Type, indicates a data type for the crack; the type is selected from the previously-described enumerated types (e.g., EX_TYPE_OPERATOR, EX_TYPE_CONSTANT, EX_TYPE_FUNCTION, and the like). If the Type is 0, then no proxy is required at the crack.

An array of ProxyDefPart records—ProxyDefs[ ]— is declared for providing a lookup table for representing the Expression Builder rules outlined above. Again using C/C++, such a structure may be declared and initialized by the following declaration:

```
ProxyDefPart far ProxyDefs[] = {
//-----------------------------------------------------------------------------
    {   EX_TYPE_OPERATOR,       EX_TYPE_OPERATOR,       ProxyOperandString,
        EX_TYPE_FIELD },
    {   EX_TYPE_OPERATOR,       EX_TYPE_FIELD,          0, 0 },
    {   EX_TYPE_OPERATOR,       EX_TYPE_CONSTANT,       0, 0 },
    {   EX_TYPE_OPERATOR,       EX_TYPE_VARIABLE,       0, 0 },
    {   EX_TYPE_OPERATOR,       EX_TYPE_FUNCTION,       0, 0 },
    {   EX_TYPE_OPERATOR,       EX_TYPE_COMMA,          ProxyOperandString,
        EX_TYPE_FIELD },
    {   EX_TYPE_OPERATOR,       EX_TYPE_ENDFUNC,        ProxyOperandString,
        EX_TYPE_FIELD },
    {   EX_TYPE_OPERATOR,       EX_TYPE_LEFTPAREN,      0, 0 },
    {   EX_TYPE_OPERATOR,       EX_TYPE_RIGHTPAREN,     ProxyOperandString,
        EX_TYPE_FIELD },
    {   EX_TYPE_OPERATOR,       0,                      ProxyOperandString,
        EX_TYPE_FIELD },
//-----------------------------------------------------------------------------
    {   EX_TYPE_FIELD,          EX_TYPE_OPERATOR,       0, 0 },
    {   EX_TYPE_FIELD,          EX_TYPE_FIELD,          ProxyOperatorString,
        EX_TYPE_OPERATOR },
    {   EX_TYPE_FIELD,          EX_TYPE_CONSTANT,       ProxyOperatorString,
        EX_TYPE_OPERATOR },
    {   EX_TYPE_FIELD,          EX_TYPE_VARIABLE,       ProxyOperatorString,
        EX_TYPE_OPERATOR },
    {   EX_TYPE_FIELD,          EX_TYPE_FUNCTION,       ProxyOperatorString,
        EX_TYPE_OPERATOR },
    {   EX_TYPE_FIELD,          EX_TYPE_COMMA,          0, 0 },
    {   EX_TYPE_FIELD,          EX_TYPE_ENDFUNC,        0, 0 },
    {   EX_TYPE_FIELD,          EX_TYPE_LEFTPAREN,      ProxyOperatorString,
        EX_TYPE_OPERATOR },
    {   EX_TYPE_FIELD,          EX_TYPE_RIGHTPAREN,     0, 0 },
    {   EX_TYPE_,               0, 0, 0 },
//-----------------------------------------------------------------------------
    {   EX_TYPE_CONSTANT,       EX_TYPE_OPERATOR,       0, 0 },
    {   EX_TYPE_CONSTANT,       EX_TYPE_FIELD,          ProxyOperatorString,
        EX_TYPE_OPERATOR },
    {   EX_TYPE_CONSTANT,       EX_TYPE_CONSTANT,       ProxyOperatorString,
        EX_TYPE_OPERATOR },
    {   EX_TYPE_CONSTANT,       EX_TYPE_VARIABLE,       ProxyOperatorString,
        EX_TYPE_OPERATOR },
    {   EX_TYPE_CONSTANT,       EX_TYPE_FUNCTION,       ProxyOperatorString,
        EX_TYPE_OPERATOR },
    {   EX_TYPE_CONSTANT,       EX_TYPE_COMMA,          0, 0 },
    {   EX_TYPE_CONSTANT,       EX_TYPE_ENDFUNC,        0, 0 },
    {   EX_TYPE_CONSTANT,       EX_TYPE_LEFTPAREN,      ProxyOperatorString,
        EX_TYPE_OPERATOR },
    {   EX_TYPE_CONSTANT,       EX_TYPE_RIGHTPAREN,     0, 0 },
    {   EX_TYPE_CONSTANT,       0, 0, 0 },
//-----------------------------------------------------------------------------
    {   EX_TYPE_VARIABLE,       EX_TYPE_OPERATOR,       0, 0 },
    {   EX_TYPE_VARIABLE,       EX_TYPE_FIELD,          ProxyOperatorString,
        EX_TYPE_OPERATOR },
    {   EX_TYPE_VARIABLE,       EX_TYPE_CONSTANT,       ProxyOperatorString,
        EX_TYPE_OPERATOR },
    {   EX_TYPE_VARIABLE,       EX_TYPE_VARIABLE,       ProxyOperatorString,
        EX_TYPE_OPERATOR },
    {   EX_TYPE_VARIABLE,       EX_TYPE_FUNCTION,       ProxyOperatorString,
        EX_TYPE_OPERATOR },
    {   EX_TYPE_VARIABLE,       EX_TYPE_COMMA,          0, 0 },
    {   EX_TYPE_VARIABLE,       EX_TYPE_ENDFUNC,        0, 0 },
    {   EX_TYPE_VARIABLE,       EX_TYPE_LEFTPAREN,      ProxyOperatorString,
        EX_TYPE_OPERATOR },
    {   EX_TYPE_VARIABLE,       EX_TYPE_RIGHTPAREN,     0, 0 },
    {   EX_TYPE_VARIABLE,       0, 0, 0 },
//-----------------------------------------------------------------------------
    {   EX_TYPE_FUNCTION,       EX_TYPE_OPERATOR,       ProxyOperandString,
        EX_TYPE_FIELD },
    {   EX_TYPE_FUNCTION,       EX_TYPE_FIELD,          0, 0 },
    {   EX_TYPE_FUNCTION,       EX_TYPE_CONSTANT,       0, 0 },
    {   EX_TYPE_FUNCTION,       EX_TYPE_VARIABLE,       0, 0 },
    {   EX_TYPE_FUNCTION,       EX_TYPE_FUNCTION,       0, 0 },
```

-continued

```
        EX_TYPE_FUNCTION ,      EX_TYPE_COMMA ,         ProxyOperandString,
{       EX_TYPE_FIELD },
{       EX_TYPE_FUNCTION ,      EX_TYPE_ENDFUNC ,       0, 0 },
{       EX_TYPE_FUNCTION ,      EX_TYPE_LEFTPAREN ,     0, 0 },
{       EX_TYPE_FUNCTION ,      EX_TYPE_RIGHTPAREN ,    0, 0 },
{       EX_TYPE_FUNCTION ,      0 , 0, 0 },
//----------------------------------------------------------------------------
{       EX_TYPE_COMMA ,         EX_TYPE_OPERATOR ,      ProxyOperandString,
        EX_TYPE_FIELD },
{       EX_TYPE_COMMA ,         EX_TYPE_FIELD ,         0, 0 },
{       EX_TYPE_COMMA ,         EX_TYPE_CONSTANT ,      0, 0 },
{       EX_TYPE_COMMA ,         EX_TYPE_VARIABLE ,      0, 0 },
{       EX_TYPE_COMMA ,         EX_TYPE_FUNCTION ,      0, 0 },
{       EX_TYPE_COMMA ,         EX_TYPE_COMMA ,         ProxyOperandString,
        EX_TYPE_FIELD },
{       EX_TYPE_COMMA ,         EX_TYPE_ENDFUNC ,       ProxyOperandString,
        EX_TYPE_FIELD },
{       EX_TYPE_COMMA ,         EX_TYPE_LEFTPAREN ,     0, 0 },
{       EX_TYPE_COMMA ,         EX_TYPE_RIGHTPAREN ,    0, 0 },
{       EX_TYPE_COMMA ,         0 , 0, 0 },
//----------------------------------------------------------------------------
{       EX_TYPE_ENDFUNC ,       EX_TYPE_OPERATOR ,      0, 0 },
{       EX_TYPE_ENDFUNC ,       EX_TYPE_FIELD ,         ProxyOperatorString,
        EX_TYPE_OPERATOR },
{       EX_TYPE_ENDFUNC ,       EX_TYPE_CONSTANT ,      ProxyOperatorString,
        EX_TYPE_OPERATOR },
{       EX_TYPE_ENDFUNC ,       EX_TYPE_VARIABLE ,      ProxyOperatorString,
        EX_TYPE_OPERATOR },
{       EX_TYPE_ENDFUNC ,       EX_TYPE_FUNCTION ,      ProxyOperatorString,
        EX_TYPE_OPERATOR },
{       EX_TYPE_ENDFUNC ,       EX_TYPE_COMMA ,         0, 0 },
{       EX_TYPE_ENDFUNC ,       EX_TYPE_ENDFUNC ,       0, 0 },
{       EX_TYPE_ENDFUNC ,       EX_TYPE_LEFTPAREN ,     ProxyOperatorString,
        EX_TYPE_OPERATOR },
{       EX_TYPE_ENDFUNC ,       EX_TYPE_RIGHTPAREN ,    0, 0 },
{       EX_TYPE_ENDFUNC ,       0 , 0, 0 },
//----------------------------------------------------------------------------
{       EX_TYPE_LEFTPAREN ,     EX_TYPE_OPERATOR ,      ProxyOperandString,
        EX_TYPE_FIELD },
{       EX_TYPE_LEFTPAREN ,     EX_TYPE_FIELD ,         0, 0 },
{       EX_TYPE_LEFTPAREN ,     EX_TYPE_CONSTANT ,      0, 0 },
{       EX_TYPE_LEFTPAREN ,     EX_TYPE_VARIABLE ,      0, 0 },
{       EX_TYPE_LEFTPAREN ,     EX_TYPE_FUNCTION ,      0, 0 },
{       EX_TYPE_LEFTPAREN ,     EX_TYPE_COMMA ,         0, 0 },
{       EX_TYPE_LEFTPAREN ,     EX_TYPE_ENDFUNC ,       0, 0 },
{       EX_TYPE_LEFTPAREN ,     EX_TYPE_LEFTPAREN ,     0, 0 },
{       EX_TYPE_LEFTPAREN ,     EX_TYPE_RIGHTPAREN ,    ProxyOperandString,
        EX_TYPE_FIELD },
{       EX_TYPE_LEFTPAREN ,     0 , 0, 0 },
//----------------------------------------------------------------------------
{       EX_TYPE_RIGHTPAREN ,    EX_TYPE_OPERATOR ,      0, 0 },
{       EX_TYPE_RIGHTPAREN ,    EX_TYPE_FIELD ,         ProxyOperatorString,
        EX_TYPE_OPERATOR },
{       EX_TYPE_RIGHTPAREN ,    EX_TYPE_CONSTANT ,      ProxyOperatorString,
        EX_TYPE_OPERATOR },
{       EX_TYPE_RIGHTPAREN ,    EX_TYPE_VARIABLE ,      ProxyOperatorString,
        EX_TYPE_OPERATOR },
{       EX_TYPE_RIGHTPAREN ,    EX_TYPE_FUNCTION ,      ProxyOperatorString,
        EX_TYPE_OPERATOR },
{       EX_TYPE_RIGHTPAREN ,    EX_TYPE_COMMA ,         0, 0 },
{       EX_TYPE_RIGHTPAREN ,    EX_TYPE_ENDFUNC ,       0, 0 },
{       EX_TYPE_RIGHTPAREN ,    EX_TYPE_LEFTPAREN ,     ProxyOperatorString,
        EX_TYPE_OPERATOR },
{       EX_TYPE_RIGHTPAREN ,    EX_TYPE_RIGHTPAREN ,    0, 0 },
{       EX_TYPE_RIGHTPAREN ,    0 , 0, 0 },
//----------------------------------------------------------------------------
{       0 ,                     EX_TYPE_OPERATOR ,      ProxyOperatorString,
        EX_TYPE_FIELD },
{       0 ,                     EX_TYPE_FIELD ,         0, 0 },
{       0 ,                     EX_TYPE_CONSTANT ,      0, 0 },
{       0 ,                     EX_TYPE_VARIABLE ,      0, 0 },
{       0 ,                     EX_TYPE_FUNCTION ,      0, 0 },
{       0 ,                     EX_TYPE_COMMA ,         0, 0 },
{       0 ,                     EX_TYPE_ENDFUNC ,       0, 0 },
{       0 ,                     EX_TYPE_LEFTPAREN ,     0, 0 },
{       0 ,                     EX_TYPE_RIGHTPAREN ,    0, 0 },
{       0 ,                     0 , 0, 0 },
//----------------------------------------------------------------------------
```

```
};
```

Each record of this table completely characterizes a given crack, by specifying Before and After data types, as well as a String and a Type for the proxy to fill the crack (if one is required).

Given Before crack and After crack token types, valid proxies that can "fill" the crack may be determined. In a preferred embodiment, this is done by a GetProxyDef method, which may be constructed as follows:

```
ProxyDefPart* CExprEditCtl::GetProxyDef(    unsigned Before,
                                            unsigned After
{
    int Loop = 0;
    int End = sizeof(ProxyDefs)/sizeof(ProxyDefPart);
    ProxyDefPart* pResult = 0;

while ( Loop < End ) {
        if ( ProxyDefs[Loop].Before == Before &&
             ProxyDefs[Loop].After == After ) { if ( ProxyDefs[Loop].String && ProxyDefs[Loop].Type )
            {
                pResult = &ProxyDefs[Loop];
            }
            break;
        }
        Loop++;
    } return pResult; // returns a particular ProxyDefPart (or 0)
}
```

As shown, the method loops through the table in search for a record having the specified Before and After members. If a match is found, the particular pResult is set to the particular ProxyDefs record and returned.

GetProxyDef is used by a GetProxyForCrack method for returning a valid placeholder for a given crack:

```
CToken* CExprEditCtl::GetProxyForCrack( HWND hWnd,
                                        CToken* pCrack )
{
    unsigned Before = 0;
    unsigned After = 0;
    CToken* pResult = 0;

if ( pCrack )
    {
        Before = pCrack—>Type; // Get type of token Before if ( pCrack—>pNextToken ) {
            After = pCrack—>pNextToken—>Type;
                                        // Get type of token After
        }
    }
    else {
        if ( pFirstToken ) {
            // pFirstToken is the first token
            // of a linked list of tokens
            After = pFirstToken—>Type; // Get type of token After
        }
    }

ProxyDefPart* pProxyDef = GetProxyDef( Before, After );
    if ( pProxyDef ) {
        pResult = NewToken(    hWnd, pProxyDef—>String,
                               pProxyDef—>Type, TRUE );
```

```
    }
    return pResult;
}
```

As shown, GetProxyForCrack is passed a pointer to a token, pCrack, which is employed for indirectly referencing a crack. By convention, the token before the crack is used for this indirect reference. If the crack is not at the beginning of the expression (pCrack is not NULL), the method gets the Before token type. If there is a next token (i.e., pCrack→pNextToken is not NULL), the method gets the After token type; otherwise, After is left at 0 (i.e., to indicate end of expression). If the crack is at the beginning of the expression (pCrack is NULL), the method sets After to the token type of the first token: After=pFirstToken→Type. Next, a call is made to GetProxyDef, passing Before and After token types. GetProxyDef in turn returns a ProxyDef record (or NULL if no matching record found). If a record is found, a NewToken method is called with String and Type for this ProxyDef record, and boolean (set to TRUE) for indicating that the token being created is a placeholder. The NewToken method returns a token placeholder for the crack. The placeholder will be inserted (by the caller) into the crack.

To determine if adjacent placeholders, Token1 and Token2, can be collapsed (a proxy token is deleted if next to a real token that is compatible), an IsCompatibleType method is used. The method returns TRUE if the placeholders can be collapsed, otherwise FALSE is returned:

```
BOOL CExprEditCtl::IsCompatibleType( CToken* Token1,
                                     CToken* Token2 )
{
    BOOL bResult = FALSE;

if ( Token1 && Token2 ) {
        BOOL Token1IsOperand = FALSE;
        BOOL Token2IsOperand = FALSE;

if ( Token1—>Type == EX_TYPE_FIELD       ||
             Token1—>Type == EX_TYPE_CONSTANT    ||
             Token1—>Type == EX_TYPE_VARIABLE    ||
             Token1—>Type == EX_TYPE_FUNCTION    ||
             Token1—>Type == EX_TYPE_LEFTPAREN      ) {

Token1IsOperand = TRUE;
        } if ( Token2—>Type == EX_TYPE_FIELD       ||
             Token2—>Type == EX_TYPE_CONSTANT    ||
             Token2—>Type == EX_TYPE_VARIABLE    ||
             Token2—>Type == EX_TYPE_FUNCTION    ||
             Token2—>Type == EX_TYPE_LEFTPAREN      ) {

Token2IsOperand = TRUE;
        } if ( Token1—>Type == EX_TYPE_OPERATOR &&
             Token2—>Type == EX_TYPE_OPERATOR ) { bResult = TRUE;
        }
        else if ( Token1IsOperand && Token2IsOperand ) {
            bResult = TRUE;
```

-continued

```
      }
   }
   return bResult;
}
```

As shown, the method is passed two tokens. The first token is examined to determined whether it is an operand (i.e., whether its type is a field, constant, variable, function, or left paren). In a similar manner, the second token may be examined. If both tokens are operands, or both are operators, the function returns TRUE—collapsing is possible.

To combine a given (real) token with its nearest neighboring placeholder (proxy), a CombineWithNearestProxy method is used:

```
BOOL CExprEditCtl::CombineWithNearestProxy( CToken* Token )
{
   BOOL bDelete = FALSE;
   if ( Token ) {
      CToken* Begin = 0;
      CToken* End = 0;

CToken* Previous = Token—>pPreviousToken;
      CToken* Next = Token—>pNextToken;

// look at prev
      if ( Previous ) {
         if ( Previous—>bProxy &&
         Is CompatibleType( Previous, Token ) )
         {
            Begin = Previous—>pPreviousToken;
            End = Previous;
            bDelete = TRUE;
         }
      } if ( !bDelete ) {
         // didn't delete
         // look at next
         if ( Next ) {
            if ( Next—>bProxy && IsCompatibleType( Next,
            Token ) ) {
               Begin = Token;
               End = Next;
               bDelete = TRUE;
            }
         }
      } if ( bDelete ) {
         DeleteTokens( Begin, End );
      }
   } return bDelete;
}
```

As shown, the method is passed a token, which is assumed to be a real (not a proxy) token. For this given token, the method examines the left-neighboring or "previous" token (Token→pPreviousToken) and the right-neighboring or "next" token (Token→pNextToken). If the passed (real) token is compatible with the "previous" token (i.e., subroutine call to IsCompatibleType(Previous, Token) returns true) and the previous token is a proxy, then the Boolean flag bDelete is set (to TRUE); a Begin/End range of tokens to collapse is set to include the "previous" token. In the case that the "previous" token is not compatible, the flag is left at its default value of FALSE.

Continuing with the method, if bDelete is FALSE after examination of the "previous" token, the "next" token is examined to determine whether it might be compatible for collapsing. If it is, bDelete is set to TRUE. The Begin/End range of tokens to collapse is set to include the passed token and the "next" token. The method then deletes any token(s) included in the Begin/End range. Finally, the method returns bDelete, as an indicator of whether the method succeeded in collapsing tokens.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. In a computer system for processing expressions entered by a user, the expressions comprising a plurality of tokens which evaluate to a result, said plurality of tokens including at least one operator token and at least one operand token, a method for assisting the user with correctly creating an expression, the method comprising:

(a) storing a set of rules specifying valid relationships between adjacent tokens;

(b) receiving user input for placing at least one token in said expression being created;

(c) determining validity of said expression being created by applying at least one of said set of rules to adjacent ones of said at least one token;

(d) if said expression being created is determined not to be valid in step (c), automatically modifying said expression so that validity of said expression being created is maintained; and (e) if modifying said expression in step (d) results in at least one addition or deletion of tokens from said expression being created, repeating steps (c) and (d) for all said at least one addition or deletion of tokens.

2. In a computer system for processing expressions entered by a user, the expressions comprising a plurality of tokens which evaluate to a result, said plurality of tokens including at least one operator token and at least one operand token, a method for assisting the user with correctly creating an expression, the method comprising:

(a) storing a set of rules specifying valid relationships between adjacent tokens, wherein said rules are adjustable to a desired target language syntax;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained.

3. In a computer system for processing expressions entered by a user, the expressions comprising a plurality of tokens which evaluate to a result, said plurality of tokens including at least one operator token and at least one operand token, a method for assisting the user with correctly creating an expression, the method comprising:

(a) storing a set of rules specifying valid relationships between adjacent tokens, wherein said tokens comprise nonreducible textual elements in said expression being created and wherein said nonreducible textual elements include selected ones of operators, function calls, arguments, and reserved words;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained.

4. In a computer system for processing expressions entered by a user, the expressions comprising a plurality of tokens which evaluate to a result, said plurality of tokens including at least one operator token and at least one operand token, a method for assisting the user with correctly creating an expression, the method comprising:

(a) storing a set of rules specifying valid relationships between adjacent tokens, wherein said rules comprise a plurality of records, each storing information specifying a type of token which can be placed between an existing pair of tokens;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained.

5. In a computer system for processing expressions entered by a user, the expressions comprising a plurality of tokens which evaluate to a result, said plurality of tokens including at least one operator token and at least one operand token, a method for assisting the user with correctly creating an expression, the method comprising:

(a) storing a set of rules specifying valid relationships between adjacent tokens;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained;

wherein step (d) includes the step of:

placing at least one placeholder token for a token whose absence from the expression would render the expression invalid.

6. The method of claim 5, wherein said at least one placeholder token includes a descriptive message indicating a literal token intended to replace said at least one placeholder token.

7. The method of claim 5, wherein said tokens comprise at least one operator for specifying an operation to be performed by said computer system on at least one operand.

8. The method of claim 7, wherein operator tokens are displayed with a first screen highlight and operand token are displayed with a second screen highlight.

9. In a computer system for processing expressions entered by a user, the expressions comprising a plurality of tokens which evaluate to a result, a method for assisting the user with correctly creating an expression, the method comprising:

(a) storing a set of rules specifying valid relationships between adjacent tokens;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained by, if two operand tokens are adjacent, automatically placing an operator placeholder token between said adjacent operand tokens.

10. In a computer system for processing expressions entered by a user, the expressions comprising a plurality of tokens which evaluate to a result, a method for assisting the user with correctly creating an expression, the method comprising:

(a) storing a set of rules specifying valid relationships between adjacent tokens;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained by, if two operator tokens are adjacent, automatically placing an operand placeholder token between said adjacent operator tokens.

11. In a computer system for processing expressions entered by a user, the expressions comprising a plurality of tokens which evaluate to a result, a method for assisting the user with correctly creating an expression, the method comprising:

(a) storing a set of rules specifying valid relationships between adjacent tokens;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained by, if an operator placeholder token is adjacent an operand placeholder token, automatically removing said operator placeholder token and said operand placeholder token.

12. In a computer system for processing expressions entered by a user, the expressions comprising a plurality of tokens which evaluate to a result, a method for assisting the user with correctly creating an expression, the method comprising:

(a) storing a set of rules specifying valid relationships between adjacent tokens;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained by, if an operator token is positioned at an end of said expression being created, automatically placing an operand placeholder token after said operator token.

13. In a computer system for processing expressions entered by a user, the expressions comprising a plurality of tokens which evaluate to a result, a method for assisting the user with correctly creating an expression, the method comprising:

(a) storing a set of rules specifying valid relationships between adjacent tokens;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained by, if an operator token is positioned at a beginning of said expression being created and said operator token represents a binary operator, automatically placing an operand placeholder token before said operator token.

14. In a computer system for processing expressions entered by a user, the expressions comprising a plurality of tokens which evaluate to a result, a method for assisting the user with correctly creating an expression, the method comprising:

(a) storing a set of rules specifying valid relationships between adjacent tokens;

receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained by the steps of:

(i) receiving user input for placing an operator token in said expression being created at a position occupied by an operator placeholder token; and (ii) automatically replacing said operator placeholder token with said operator token.

15. In a computer system for processing expressions entered by a user, the expressions comprising a plurality of tokens which evaluate to a result, a method for assisting the user with correctly creating an expression, the method comprising:

(a) storing a set of rules specifying valid relationships between adjacent tokens;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained by the steps of:

(i) receiving user input for placing an operand token in said expression being created at a position occupied by an operand placeholder token; and (ii) automatically replacing said operand placeholder token with said operand token.

16. In a computer system for processing expressions entered by a user, the expressions comprising a plurality of tokens which evaluate to a result, said plurality of tokens including at least one operator token and at least one operand token, a method for assisting the user with correctly creating an expression, the method comprising:

(a) storing a set of rules specifying valid relationships between adjacent tokens, wherein said tokens include a pair of grouping tokens for grouping related ones of said tokens;

(b) receiving user input for placing at least one token in said expression being created;

(c) determining validity of said expression being created by applying at least one of said set of rules to adjacent ones of said at least one token;

(d) if said expression being created is determined not to be valid in step (c), automatically modifying said expression so that validity of said expression being created is maintained; and (e) if one of a pair of grouping tokens is deleted, automatically deleting the other of the pair.

17. In a computer system for processing expressions entered by a user, the expressions comprising a plurality of tokens which evaluate to a result, a method for assisting the user with correctly creating an expression, the method comprising:

(a) storing a set of rules specifying valid relationships between adjacent tokens, wherein said tokens include a function token comprising a function name followed by a left paren, said function token corresponding with it matching right paren token;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained by, if either one of a function token or its corresponding right paren token is deleted, automatically deleting the other.

18. In a computer system for processing expressions entered by a user, the expressions comprising a plurality of tokens which evaluate to a result, said plurality of tokens including at least one operator token and at least one operand token, a method for assisting the user with correctly creating an expression, the method comprising:

(a) storing a set of rules specifying valid relationships between adjacent tokens, wherein said tokens include a function token comprising a function name followed by a left paren, said function token corresponding with a matching right paren token, and wherein said tokens include comma-delimited function parameter tokens corresponding with a function token, each function parameter token including a descriptive message indicating usage and type for the parameter;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained.

19. In a computer system for processing expressions entered by a user, the expressions comprising a plurality of tokens which evaluate to a result, a method for assisting the user with correctly creating an expression, the method comprising:

(a) storing a set of rules specifying valid relationships between adjacent tokens, wherein said tokens include comma-delimited function parameter tokens corresponding with a function token;

(b) receiving user input for placing at least one token in said expression being created;

(c) determining validity of said expression being created by applying at least one of said set of rules to adjacent ones of said at least one token; and (d) if said expression being created is determined not to be valid in step (c), automatically modifying said expression so that validity of said expression being created is maintained by, if a function token is deleted, said function token having corresponding comma-delimited function parameter tokens, automatically replacing each comma delimiter of the parameter tokens with a placeholder operator token.

20. In a computer system for processing expressions entered by a user, the expressions comprising a plurality of tokens which evaluate to a result, a method for assisting the user with correctly creating an expression, the method comprising;

(a) storing a set of rules specifying valid relationships between adjacent tokens, wherein said tokens include comma-delimited function parameter tokens corresponding with a function token;

(b) receiving user input for placing at least one token in said expression being created:

(c) determining validity of said expression being created by applying at least one of said set of rules to adjacent ones of said at least one token; and (d) if said expression being created is determined not to be valid in step (c), automatically modifying said expression so that validity of said expression being created is maintained by, if a function token is placed at a position in the expression before an operand token, said function token having corresponding comma-delimited function parameter tokens, automatically placing the operand token as a first parameter token for the function.

21. In a system for processing commands entered by a user, the commands including expressions which resolve to a result, a method comprising:

(a) receiving input from the user specifying a desired expression;

(b) dividing said input into a plurality of tokens, said plurality of tokens including at least one operator token and at least one operand token;

(c) determining validity of said desired expression by comparing said tokens against a set of rules specifying valid relationships between tokens;

(d) if said desired expression being created is determined not to be valid in step (c), automatically modifying said desired expression so that validity of said desired expression is maintained;

(e) placing at least one proxy token for a token whose absence from said desired expression would render said desired expression invalid or incomplete; and (f) using said desired expression in resolving said result.

22. The method of claim 21, further comprising:

indicating to the user what is needed to render said desired expression valid and complete.

23. The method of claim 21, wherein each said at least one proxy token is color-coded for representing a required data type.

24. In a system for processing commands entered by a user, the commands including expressions which resolve to a result, a method comprising:

(a) receiving input from the user specifying a desired expression;

(b) dividing said input into a plurality of tokens, said plurality of tokens including at least one operator token and at least one operand token;

(c) displaying a list of token elements which may be pasted to said desired expression, said list being adjusted according to a user-selected element type;

(d) determining validity of said desired expression by comparing said tokens against a set of rules specifying valid relationships between tokens;

(e) if said desired expression being created is determined not to be valid in step (d), automatically modifying said desired expression so that validity of said desired expression is maintained; and (f) using said desired expression in resolving said result.

25. A development system for creating an expression from data entered by a user, said expression comprising a plurality of tokens which evaluate to a result, said plurality of tokens including at least one operator token and at least one operand token, said system comprising:

a computer having a processor and a memory;

means for storing in said memory information specifying valid relationships between tokens;

input means for receiving user input for placing at least one token in said expression being created;

means for determining validity of said expression being created by applying said rules to adjacent ones of said at least one token;

means for automatically modifying said expression so that validity of said expression being created is maintained; and means for placing at least one proxy token for a token whose absence from the expression would render the expression invalid or incomplete.

26. The system of claim 25, further comprising:

means for indicating to the user on a display screen what input is needed to render the expression valid and complete.

27. The system of claim 25, wherein each said at least one proxy token is color-coded for representing a particular data type.

28. A development system for creating an expression from data entered by a user, said expression comprising a plurality of tokens which evaluate to a result, said plurality of tokens including at least one operator token and at least one operand token, said system comprising:

a computer having a processor and a memory;

means for storing in said memory information specifying valid relationships between tokens;

input means for receiving user input for placing at least one token in said expression being created;

means for displaying a list of token elements which may be pasted to the expression with said input means, said list being adjusted according to a user-selected element type;

means for determining validity of said expression being created by applying said rules to adjacent ones of said at least one token; and means for automatically modifying said expression so that validity of said expression being created is maintained.

29. A computer system for creating an expression comprising:

a processor and a memory;

means for storing information for a desired target language in said memory, said information specifying valid combinations of elements for said expression, said valid combinations of elements comprising at least one element which operates on at least one other element;

an interface means for specifying an edit operation at a desired location in said expression, said edit operation for adding or deleting an element, and wherein said interface means includes a display means for listing elements available for placement in the expression;

comparison means for comparing said edit operation with said information; and means for automatically modifying said edit operation so that said expression maintains said valid combinations of elements.

30. A computer system for creating an expression comprising:

a processor and a memory;

means for storing information for a desired target language in said memory, said information specifying valid combinations of elements for said expression, said valid combinations of elements comprising at least one element which operates on at least one other element;

an interface means for specifying an edit operation at a desired location in said expression, said edit operation for adding or deleting an element;

comparison means for comparing said edit operation with said information, wherein said information includes rules specifying an element which can be legally placed at a given location, said given location being defined by elements neighboring the location; and means for automatically modifying said edit operation so that said expression maintains said valid combinations of elements.

\* \* \* \* \*